US012188296B2

(12) United States Patent
Mangiapane et al.

(10) Patent No.: US 12,188,296 B2
(45) Date of Patent: Jan. 7, 2025

(54) SHUTTER PANEL WITH AN AUTOMATIC LOUVER CLOSURE ASSEMBLY AND RELATED DAMPING FEATURES

(71) Applicant: Hunter Douglas Inc., Pearl River, NY (US)

(72) Inventors: Brent Mangiapane, Phoenix, AZ (US); Michael F. Schroeder, Chandler, AZ (US); Scott J. Mydock, Phoenix, AZ (US)

(73) Assignee: Hunter Douglas Inc., Pearl River, NY (US)

(*) Notice: Subject to any disclaimer, the term of this patent is extended or adjusted under 35 U.S.C. 154(b) by 1018 days.

(21) Appl. No.: 16/936,139

(22) Filed: Jul. 22, 2020

(65) Prior Publication Data

US 2021/0025224 A1 Jan. 28, 2021

Related U.S. Application Data

(60) Provisional application No. 62/979,519, filed on Feb. 21, 2020, provisional application No. 62/878,871, filed on Jul. 26, 2019.

(51) Int. Cl.

| | |
|---|---|
| ***E06B 7/096*** | (2006.01) |
| ***E06B 7/09*** | (2006.01) |
| ***E06B 9/04*** | (2006.01) |

(52) U.S. Cl.
CPC ................ *E06B 7/096* (2013.01); *E06B 7/09* (2013.01); *E06B 9/04* (2013.01)

(58) Field of Classification Search
CPC .... E06B 7/09; E06B 7/086–098; E06B 7/084; E06B 3/5036; E06B 3/5009
See application file for complete search history.

(56) References Cited

U.S. PATENT DOCUMENTS

| | | | |
|---|---|---|---|
| 2,506,829 | A | 5/1950 | Hamilton |
| 2,554,822 | A | 5/1951 | Geier |
| RE24,059 | E | 9/1955 | Pinion |
| 3,868,156 | A | 2/1975 | Vander Ley |

(Continued)

FOREIGN PATENT DOCUMENTS

| | | | |
|---|---|---|---|
| AU | 2016/262687 | A1 | 6/2017 |
| CA | 2710407 | | 7/2009 |

(Continued)

OTHER PUBLICATIONS

British Search Report Corresponding to Application No. GB2011490.6 on Oct. 28, 2021 (2 pages).

(Continued)

*Primary Examiner* — Daniel P Cahn
*Assistant Examiner* — Patrick B. Ponciano
(74) *Attorney, Agent, or Firm* — Dority & Manning, P.A.

(57) ABSTRACT

A shutter panel includes a frame, and a louver coupled to the frame for rotation about a longitudinal axis across a given angular travel range of the louver. The shutter panel also includes a louver closure assembly operable to automatically rotate the louver into a closed position when the louver is moved into a specific angular range of louver positions within its angular travel range. For instance, in an exemplary implementation, the louver closure assembly is configured to linear translation into rotational movement of the louver.

23 Claims, 15 Drawing Sheets

(56) References Cited

U.S. PATENT DOCUMENTS

| | | | | |
|---|---|---|---|---|
| 4,255,899 | A * | 3/1981 | Braithwaite | E06B 7/086 49/31 |
| 4,398,700 | A | 8/1983 | Thome | |
| 4,576,088 | A | 3/1986 | Mathewes et al. | |
| 4,787,120 | A | 11/1988 | Haigh | |
| 4,864,691 | A | 9/1989 | Gidseg | |
| 4,999,948 | A | 3/1991 | Hodgens | |
| 5,216,837 | A | 6/1993 | Cleaver | |
| 5,347,756 | A | 9/1994 | Abbott | |
| 5,887,386 | A | 3/1999 | Alexanian | |
| 5,904,411 | A | 5/1999 | Hayakawa | |
| 6,014,839 | A | 1/2000 | Ruggles | |
| 6,145,251 | A * | 11/2000 | Ricci | E06B 7/096 49/82.1 |
| 6,250,012 | B1 * | 6/2001 | Ricci | E06B 7/086 49/90.1 |
| 6,536,162 | B2 * | 3/2003 | LaMay | E06B 7/086 49/74.1 |
| 6,848,759 | B2 | 2/2005 | Doornbos et al. | |
| 6,854,211 | B1 * | 2/2005 | Blachley | E06B 9/02 49/82.1 |
| 7,168,475 | B2 | 1/2007 | Colson | |
| 7,574,827 | B2 | 8/2009 | Huang | |
| 7,628,195 | B2 | 12/2009 | Drew | |
| 7,963,071 | B2 | 6/2011 | Alexander | |
| 8,060,983 | B2 | 11/2011 | Bortoluzzi | |
| 8,474,187 | B2 | 7/2013 | Marocco | |
| 8,533,996 | B1 * | 9/2013 | Stone | E06B 7/096 49/82.1 |
| 8,590,989 | B2 | 11/2013 | Lowe | |
| 8,640,305 | B2 | 2/2014 | Pecar | |
| 8,857,106 | B2 * | 10/2014 | Colson | E06B 7/096 49/82.1 |
| 9,038,314 | B2 | 5/2015 | Chen | |
| 9,297,202 | B2 | 3/2016 | Watkins | |
| 9,732,553 | B2 | 8/2017 | Rotchell | |
| 9,863,178 | B2 | 1/2018 | Want et al. | |
| 9,872,563 | B2 | 1/2018 | Davis | |
| 10,036,196 | B2 * | 7/2018 | Chen | E06B 7/096 |
| 10,294,713 | B2 | 5/2019 | Holford et al. | |
| 11,959,333 | B2 * | 4/2024 | Biro | E06B 7/086 |
| 2005/0246863 | A1 | 11/2005 | Chesworth | |
| 2005/0257429 | A1 * | 11/2005 | Yorgason | E06B 7/096 49/82.1 |
| 2008/0244979 | A1 | 10/2008 | Huang et al. | |
| 2010/0270113 | A1 | 10/2010 | Ogawa | |
| 2011/0041407 | A1 | 2/2011 | Van De Bult | |
| 2011/0197513 | A1 * | 8/2011 | Marocco | E06B 7/096 49/82.1 |
| 2015/0176327 | A1 | 6/2015 | Goyco-Graziani | |
| 2015/0184457 | A1 | 7/2015 | Zhang | |
| 2015/0368959 | A1 * | 12/2015 | Holford | E06B 7/09 49/82.1 |
| 2018/0223579 | A1 | 8/2018 | Walz | |

FOREIGN PATENT DOCUMENTS

| | | | | |
|---|---|---|---|---|
| CN | 201972562 | | 9/2011 | |
| CN | 116752866 | A * | 9/2023 | |
| CN | 111439340 | B * | 4/2024 | B63B 19/00 |
| DE | 202008012990 | U1 | 12/2008 | |
| EP | 0399130 | | 11/1990 | |
| EP | 1640537 | A2 | 3/2006 | |
| EP | 2136021 | A3 | 12/2009 | |
| EP | 2365174 | A3 | 9/2011 | |
| IT | 1219943 | B * | 5/1990 | E06B 7/086 |
| JP | 5926119 | B2 | 4/2016 | |
| JP | 2017/115418 | A | 6/2017 | |
| JP | 2017/115419 | A | 6/2017 | |
| JP | 2019/007152 | A | 1/2019 | |
| KR | 2004/06154 | Y1 | 1/2006 | |
| WO | WO-2009084188 | A1 * | 7/2009 | E05D 15/44 |
| WO | WO 2018/137885 | A1 | 8/2018 | |
| WO | WO 2018/142342 | A1 | 8/2018 | |

OTHER PUBLICATIONS

Canadian Office Action dated Dec. 7, 2018 (5 pages).

PCT International Search Report and Written Opinion for International Application No. PCT/US2013/031780 dated May 31, 2013. (8 pages).

* cited by examiner

SHUTTER PANEL WITH AN AUTOMATIC LOUVER CLOSURE ASSEMBLY AND RELATED DAMPING FEATURES

CROSS-REFERENCE TO RELATED APPLICATIONS

The present application is based upon and claims the right of priority to U.S. Provisional Application No. 62/878,871, filed Jul. 26, 2019, and U.S. Provisional Application No. 62/979,519, filed Feb. 21, 2020, the disclosures of both of which are hereby incorporated by reference herein in the entirety for all purposes.

FIELD

The present subject matter relates generally to coverings for architectural structures and related systems and, more particularly, to a shutter panel with a louver closure assembly and related damping features for providing automatic closure of the shutter's louvers in a controlled manner.

BACKGROUND

Louvered shutter panels for architectural structures, such as doors, windows, and the like, have taken numerous forms for many years. Each shutter panel typically includes a shutter frame and a plurality of louvers configured to rotate relative to the shutter frame. For instance, the ends of the louvers are often rotatably coupled to the shutter frame via louver pegs or posts to allow the louvers to be rotated relative to the frame between a substantially vertical orientation or closed portion and a substantially horizontal orientation or opened position. During operation, a consumer or user may rotate the louvers to a desired position that provides a preferred amount of light and privacy.

U.S. Pat. No. 10,294,713 to Holford et al (the '713 patent), issued May 21, 2019 and hereby incorporated by reference herein in its entirety for all purposes, discloses a shutter panel with automatic louver closure features. Specifically, the '713 patent discloses a louver closure device that is configured to be installed within a frame of the shutter panel to facilitate automatic closure of the louvers via operation of the components within the louver closure device depending on the angular orientation of the louver to which the device is coupled. In addition, the '713 patent discloses a louver damping device that can be used in combination with the louver closure device to dampen the rotation of the louvers as they are being closed. Such devices provide an effective solution for automatically actuating the louvers to their closed position. However, improvements and advancements in such automatic louver closure/damping technology would still be welcomed to meet the ever-changing demands and expectations of consumers, as well as to facilitate automatic louver closure/damping within shutter panels having differing configurations, such as panels with differing louver tilt assemblies.

Accordingly, an improved louver closure assembly and related damping features for allowing automatic louver closure in a controlled manner would be welcomed in the technology.

BRIEF SUMMARY

Aspects and advantages of the present subject matter will be set forth in part in the following description, or may be obvious from the description, or may be learned through practice of the present subject matter.

In various aspects, the present subject matter is directed to a shutter panel for an architectural structure. In one embodiment, the shutter panel includes a frame and a louver coupled to the frame for rotation about a longitudinal axis across a given angular travel range of the louver. Additionally, in one embodiment, the shutter panel includes a louver closure assembly operable to automatically rotate the louver into a closed position when the louver is moved into a specific angular range of louver positions within its angular travel range.

Moreover, in one embodiment, the shutter panel comprises a damper operable to resist rotation of the louver into the closed position. For instance, in one embodiment, the damper is operable to resist rotation of the louver into the closed position by selectively engaging the louver closure assembly when the louver is moved into the specific angular range of louver positions in a manner that resists movement or translation of the louver closure assembly within the frame.

These and other features, aspects, and advantages of the present subject matter will become better understood with reference to the following Detailed Description and appended claims. The accompanying drawings, which are incorporated in and constitute a part of this specification, illustrate embodiments of the present subject matter and, together with the description, serve to explain the principles of the present subject matter.

This Brief Summary is provided to introduce a selection of concepts in a simplified form that are further described below in the Detailed Description. This Brief Summary is not intended to identify key features or essential features of the claimed subject matter, nor is it intended as an aid in determining the scope of the claimed subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Figure 1:
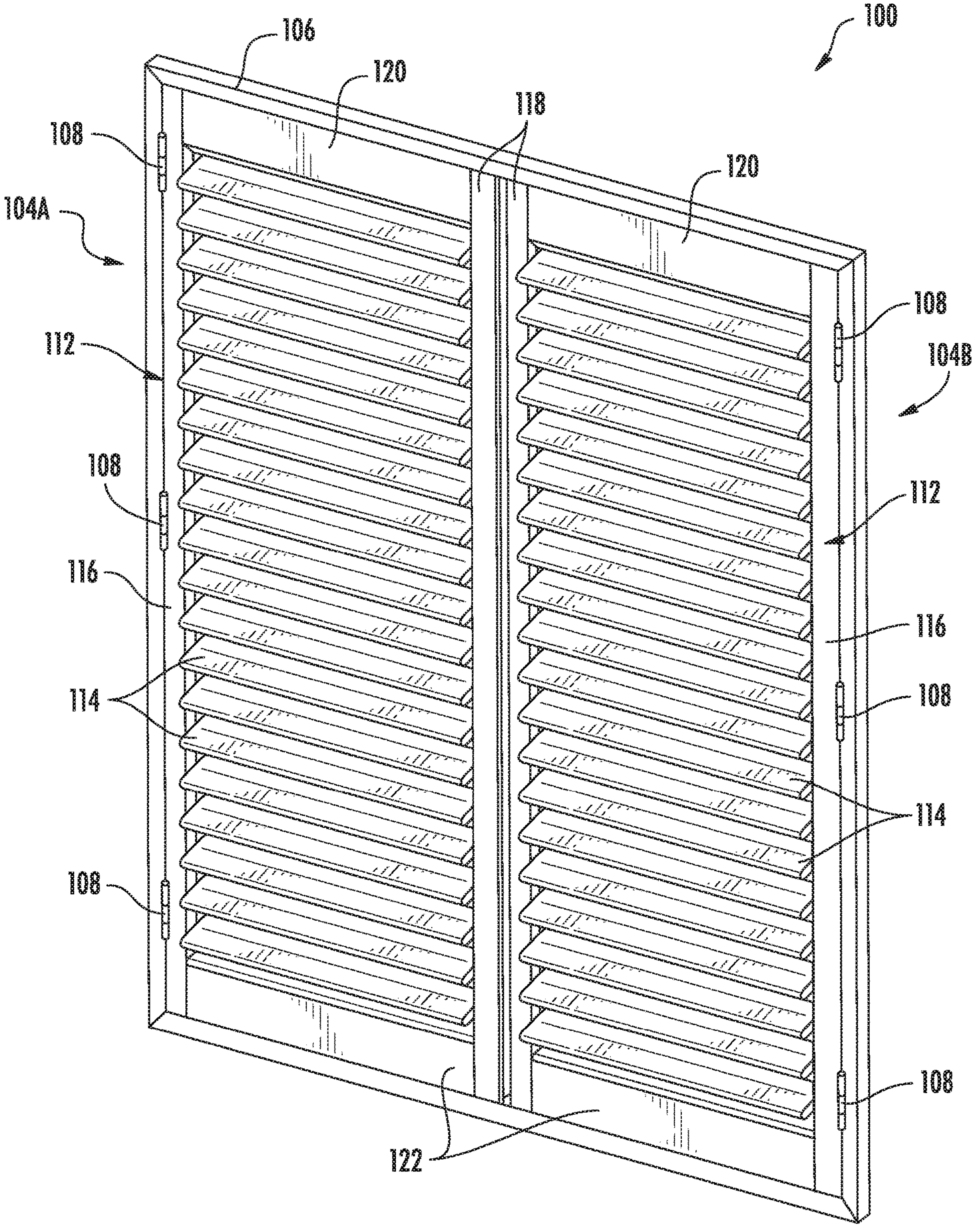
FIG. 1 illustrates a perspective view of one illustrative embodiment of a shutter assembly configured for use as a covering for an architectural structure in accordance with aspects of the present subject matter, particularly illustrating shutter panels of the assembly in a closed position relative to the adjacent architectural structure.

In general, the present subject matter is directed to shutter panels configured for use as a covering for an architectural feature or structure (referred to herein simply as an architectural "structure" for the sake of convenience and without intent to limit). In one embodiment, the shutter panel includes a frame and a plurality of louvers coupled to the frame for rotation about their respective longitudinal axes across a given angular travel range. Additionally, in one embodiment, the shutter panel includes a louver closure assembly operable to automatically rotate the louvers into a closed position when the louvers are moved into a specific angular range of louver positions within the angular travel range. It should be appreciated that, for purposes of description and without intent to limit, the term "automatic", when used in the context of rotation or movement of components of the disclosed shutter panel, generally refers to such rotation or movement occurring without requiring an active or current input from a user of the shutter panel.

In one embodiment, the angular travel range of the louvers includes a first angular range of louver positions encompassing the fully opened position of the louvers and second and third angular ranges of louver positions extending from opposed ends of the first angular range that encompass first and second fully closed positions of the louvers, respectively. In one embodiment, the first angular range of louver positions corresponds to a non-automatic louver closure range across which each louver is configured to remain in the position in which it is placed until a subsequent user-initiated force is applied to rotate the louver to a different position. Additionally, in one embodiment, the second and third angular ranges of louver positions correspond to automatic louver closure ranges across which the louvers are configured to be automatically actuated or rotated into their corresponding closed positions. In such an embodiment, the louver closure assembly may be operable to automatically close the louvers when the louvers are rotated to a louver position within one of the second or third angular ranges of louver positions.

In one embodiment, the louver closure assembly includes first and second actuators positioned within the shutter frame. The first and second actuators are configured to be coupled to one of the louvers such that linear translation of the actuators results in rotation of such louver. Additionally, in one embodiment, when the louvers are rotated to a louver position within one of the second or third angular ranges of louver positions, the first and second actuators are configured to engage each other in a manner that results in automatic linear translation of the actuators to drive or rotate the louvers to the associated closed position, such as by causing the louvers to rotate without any further user input or additional force.

In one embodiment, the first and second actuators are configured to be coupled to one of the louvers such that linear translation of the actuators in opposite directions results in rotation of the louver. For instance, in one embodiment, the first and second actuators may include first and second gear rack sections, respectively. In such an embodiment, the louver may be coupled to the first and second rack sections via a louver tilt gear configured to mesh with the first and second rack sections such that linear translation of the first and second actuators in opposite directions rotationally drives the louver tilt gear.

Additionally, in one embodiment, one of the actuators comprises a follower member (e.g., a spring-biased plunger) and the other actuator comprises an engagement section defining a cam profile. In one embodiment, the follower member is biased into engagement with the engagement section such that the follower member rides along the cam profile as the first and second actuators linearly translate with rotation of the louvers.

Moreover, in one embodiment, the cam profile of the engagement section includes differing cam profile portions, such as first, second, and third cam profile portions. In such an embodiment, the follower member may be configured to ride across each respective cam profile portion depending on the angular orientation of the louver, such as by configuring the follower member to ride across the first cam profile portion when the louvers are being rotated across the first angular range of louver positions, and by configuring the follower member to ride across the second and third cam profile portions when the louvers are being rotated across the second and third angular ranges of louver positions, respectively.

In one embodiment, the second and third cam profile portions are shaped and configured such that, as the louvers are rotated from the first angular range of louver positions to either the second angular range of louver positions or the third angular range of louver positions, the follower member engages the engagement section in a manner that causes the actuators to translate linearly in opposite directions within the frame. For instance, the second and third cam profile portions may include ramp surfaces along which the follower member is configured to freely slide down (i.e., without any user interface) such that a resultant force is applied through the actuators that results in opposed linear translation of the first and second actuators within the frame. Additionally, in one embodiment, the first cam profile portion is shaped and configured such that, as the louver is rotated across the first angular range of louver positions, the follower member engages the engagement section without causing automatic linear translation of the first and second actuators. Moreover, in one embodiment, the first cam profile portion includes one or more recessed engagement features formed therein, such as detents, to corresponding to predefined louver position settings within the first angular range of louver positions.

In one embodiment, both actuators are configured to include a follower member configured to be biased into engagement with a corresponding engagement section of the other actuator. For instance, in one embodiment, the first actuator includes a first follower member configured to be biased into engagement with a corresponding engagement section of the second actuator, and the second actuator includes a second follower member configured to be biased into engagement with a corresponding engagement section of the first actuator.

Moreover, in one embodiment, the shutter panel includes a damper operable to resist rotation of the louvers into their closed positions. For instance, in one embodiment, the damper is operable to resist rotation of the louvers into the closed position by selectively engaging the louver closure assembly when the louvers are moved to a louver position within one of the second or third angular ranges of louver positions, thereby allowing the damper to slow or reduce the rate of rotation of the louvers as the louver closure assembly is acting to automatically close the louvers. In such an embodiment, the damper may be configured to be engaged with the louver closure assembly when the louvers are rotated across the second and third angular ranges of louver positions, but disengaged from the louver closure assembly when the louvers are rotated across the first angular range of louver positions.

In one embodiment, the damper is configured to selectively engage the first and second actuators depending on which of the second and third angular ranges of louver positions across which the louvers are currently being rotated. For instance, in one embodiment, the damper is configured to engage either the first actuator or the second actuator when the louvers are rotated across the second angular range of louver positions, and to engage the other of the first actuator or the second actuator when the louvers are rotated across the third angular range of louver positions. In one embodiment, the damper is positioned within the shutter frame relative to the louver closure assembly such that a contact surface of one of the first actuator or the second actuator contacts the damper as the louvers are rotated through the second angular range of louver positions and a contact surface of the other of the first actuator or the second actuator contacts the damper as the louvers are rotated through the third angular range of louver positions.

Additionally, in one embodiment, the damper comprises a linear damper. For instance, in one embodiment, the damper is configured as a dashpot damper. In such an embodiment, when the louver closure assembly engages a contact end of the dashpot damper, the damper compresses at a controlled rate to regulate the closure of the louvers as the louver closure assembly is functioning to automatically rotate the louvers to their closed position.

In one embodiment, the first and second actuators are configured to translate linearly relative to each other as the louvers are rotated across their angular travel range in both a first direction towards their first closed position, and a second direction towards their second closed position. Additionally, in one embodiment, the damper is operable to resist rotation of the louvers by engaging one of the first and second actuators when the louver is rotated in the first direction towards the first closed position, and by engaging the other of the first and second actuators when the louver is rotated in the second direction towards the second closed position.

In one embodiment, the shutter panel further comprises a louver tilt assembly coupled to the louvers. In one embodiment, the louver tilt assembly includes first and second gear racks extending within the frame and a plurality of louver tilt gears configured to mesh with the gear racks. In such an embodiment, each of the louver tilt gears is coupled to a respective one of the louvers for rotation therewith. Additionally, in one embodiment, the first and second actuators of the louver closure assembly are configured to be coupled to the first and second gear racks of the louver tilt assembly, respectively, to allow the actuators and the gear racks to translate linearly with one another within the frame. For instance, in one embodiment, the actuators may be configured to be coupled to the gear racks at the top end of the louver tilt assembly, the bottom end of the louver tilt assembly, and/or at a location between the top and bottom ends of the louver tilt assembly.

Moreover, in one embodiment, each of the gear racks is formed from a plurality of rack segments. For instance, each gear rack may comprise a plurality of rack segments coupled end-to-end to form the associated rack. The rack segments may, in one embodiment, be coupled to each other via a common interface arrangement, such as a male/female interface arrangement.

Additionally, in one embodiment, the gear racks and associated rack segments may form part of a modular louver closure and tilt system for use within a shutter panel. For instance, aligned rack segments of the first and second gear racks may be configured as a modular rack section that can be removed and replaced with a corresponding modular louver closure assembly. As such, the modular louver closure assembly may be installed within the shutter panel in place of the modular rack section to provide, for example, an additional or supplementary closing force within the system.

It should be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one embodiment can be used separately, or with another embodiment to yield a still further embodiment. Thus, it is intended that the present subject matter covers such modifications and variations as come within the scope of the appended claims and their equivalents.

Figure 2:
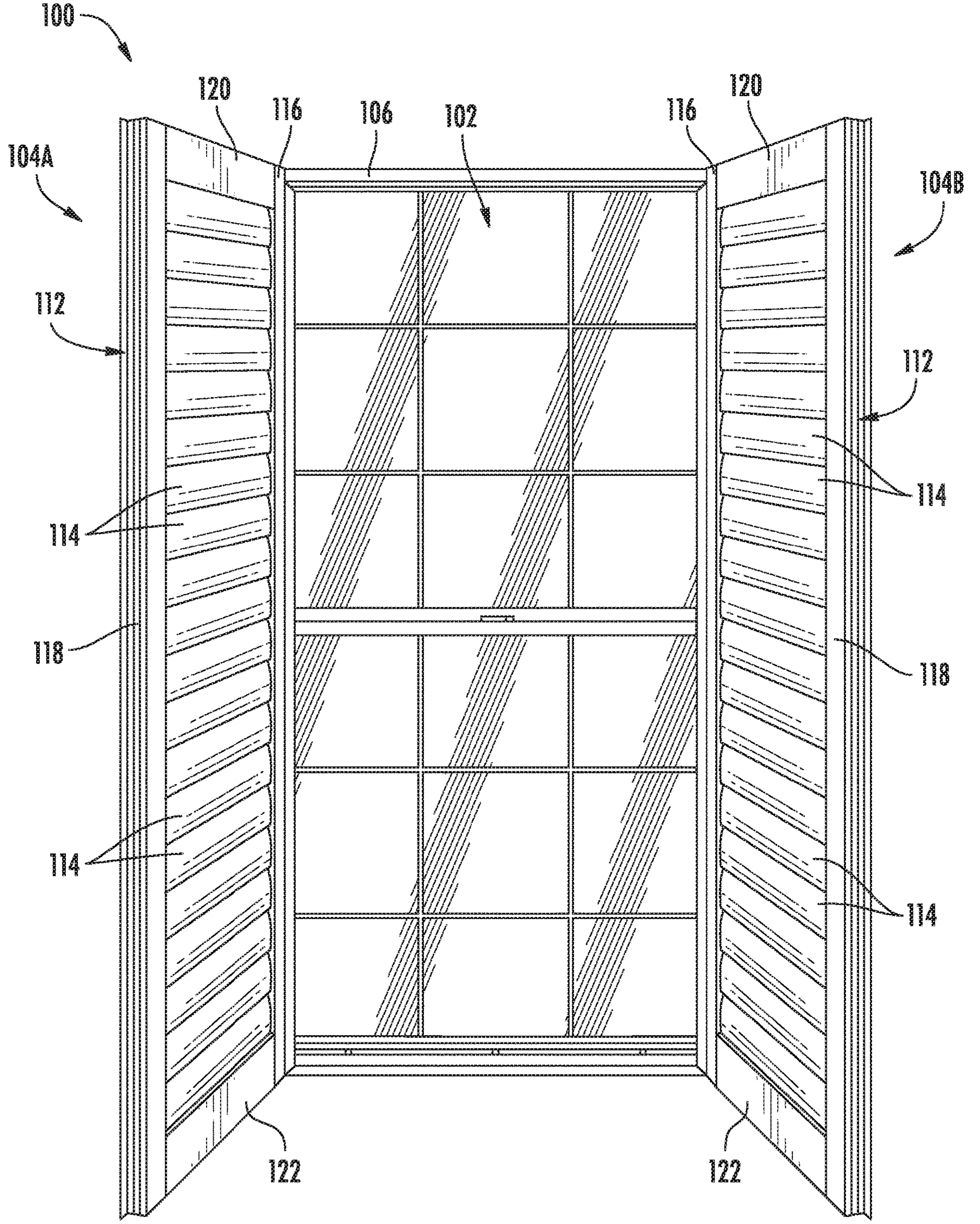
FIG. 2 illustrates a front view of the shutter assembly shown in FIG. 1, particularly illustrating the shutter panels in an open position relative to the adjacent architectural structure.

Referring now to FIGS. 1 and 2, differing views of one example of an illustrative embodiment of a shutter assembly 100 configured for use as a covering for an architectural structure 102 (FIG. 2) are illustrated in accordance with aspects of the present subject matter. As shown, the shutter assembly 100 generally includes one or more shutter panels 104A, 104B configured to be coupled to an outer frame 106 (e.g., a frame defining or associated with the adjacent architectural structure 102). For instance, in the illustrated embodiment, the shutter assembly 100 includes both a first shutter panel 104A and a second shutter panel 104B coupled to outer frame 106. However, in other embodiments, the shutter assembly 100 may only include a single shutter panel installed relative to the outer frame 106 or three or more shutter panels installed relative to the outer frame 106. As shown in FIGS. 1 and 2, the shutter panels 104A, 104B are, in one embodiment, pivotably coupled to the outer frame 106 (e.g., via hinges 108 (FIG. 1)) to allow the shutter panels 104A, 104B to be moved between closed (FIG. 1) and open positions (FIG. 2) relative to the adjacent architectural structure 102.

In general, each shutter panel 104A, 104B includes a shutter frame 112 and a plurality of louvers 114 configured to rotate relative to the associated frame 112. As shown in FIGS. 1 and 2, each shutter frame 112 has a generally rectangular shape defined by a first vertically extending stile 116, an opposed second vertically extending stile 118, and top and bottom rails 120, 122 extending horizontally between the vertically extending stiles 116, 118. Additionally, as shown in the illustrated embodiment, the louvers 114 of each shutter panel 104A, 104B extend horizontally between the vertical stiles 116, 118 of each shutter frame 112, with each louver 114 being supported for rotation about its longitudinal axis relative to the adjacent shutter frame 112 approximately 180 degrees across an angular travel range of the louver 114 to vary the degree to which the architectural structure 102 may be viewed through each shutter panel 104A, 104B when the panels 104A, 104B are at their closed positions. For instance, the louvers 114 may be rotated to a substantially horizontal orientation (e.g., a fully open position as shown in FIG. 1) to allow maximum exposure to the architectural structure 102 through shutter panels 104A, 104B. Similarly, the louvers 114 may be rotated approximately 90 degrees in one direction or the other from the substantially horizontal orientation to a substantially vertical orientation (e.g., a fully closed position as shown in FIG. 2) to block the view through the shutter panels 104A, 104B. For instance, when at their substantially vertical orientation, adjacent louvers 114 may vertically overlap each other at their top and bottom ends to fully block the view through the shutter panels 104A, 104B.

In several embodiments, one or more groups or sections of the various louvers 114 may be coupled together in a manner that allows the louvers 114 to rotate simultaneously or otherwise in unison with one another. For example, as will be described below with reference to FIG. 4, each shutter panel 104A, 104B may include a louver tilt assembly located within its frame 112 (e.g., within one of the stiles 116, 118) that couples all of the louvers 114 included within such panel 104A, 104B to one another. As such, rotation of one of the louvers 114 within a given shutter panel 104A, 104B about its longitudinal axis may result in corresponding rotation of the remainder of the louvers 114 included within such panel about their respective longitudinal axes. It should be appreciated that, as opposed to coupling all of the louvers together within a given shutter panel via a single louver tilt assembly, the louvers 114 may, instead, be divided into sub-groups, with each sub-group of louvers 114 being provided in operative association with a respective louver tilt assembly that allows for such sub-group of louvers 114 to be rotated in unison with one another. For instance, in one embodiment, each shutter panel 104A, 104B may include upper and lower groups of louvers 114 (e.g., separated via an intermediate rail extending between the stiles 116, 118), with each group of louvers 114 being coupled together for simultaneous rotation via an associated louver tilt assembly.

Figure 3:
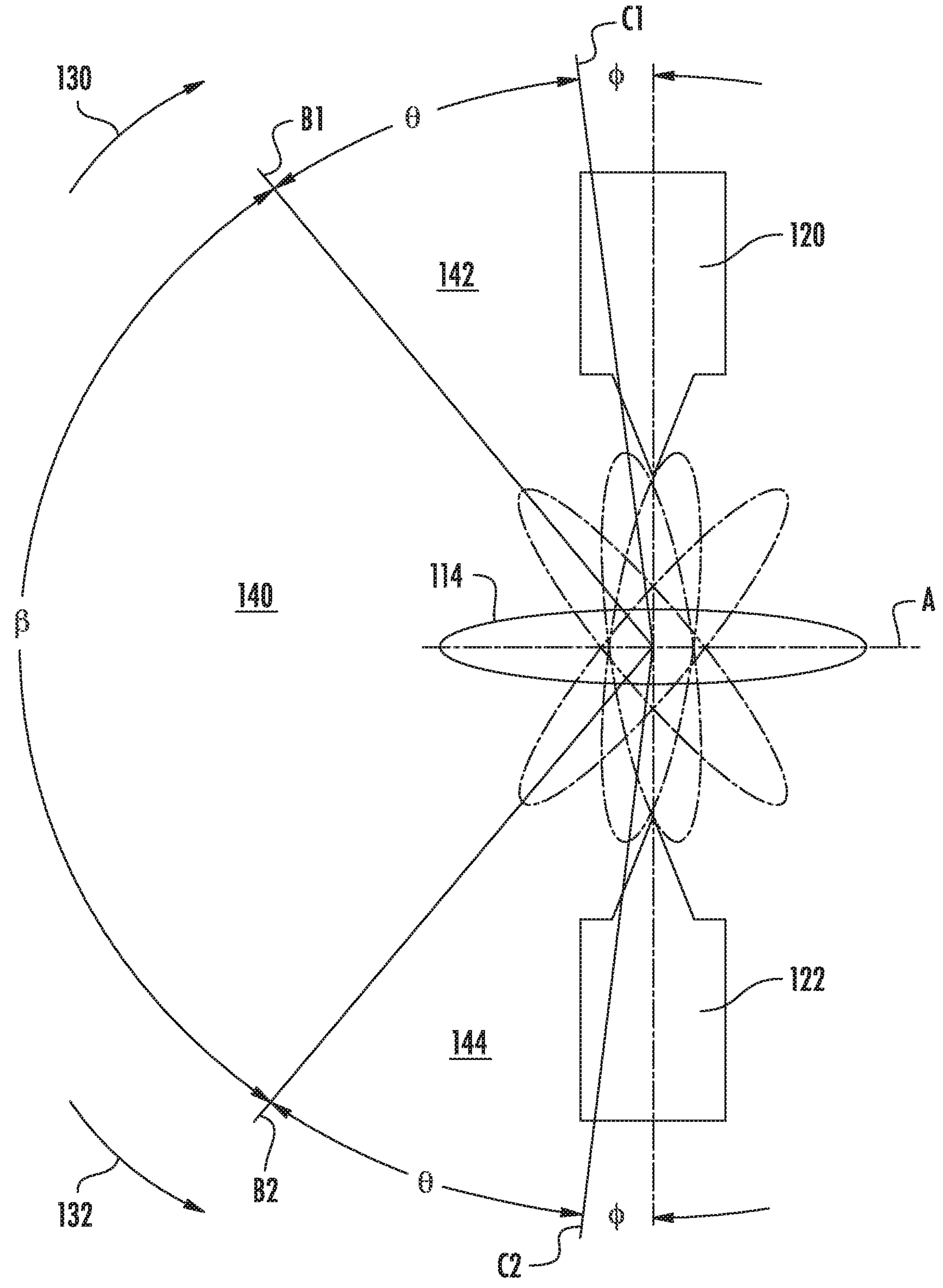
FIG. 3 illustrates a schematic view of an exemplary angular travel range across which the louvers of the shutter panels described above with reference to FIGS. 1 and 2 can be rotated in accordance with aspects of the present subject matter.

Referring now to FIG. 3, a schematic view of an exemplary angular travel range across which the louvers 114 of the shutter panels 104A, 104B described above with reference to FIGS. 1 and 2 may be rotated is illustrated in accordance with aspects of the present subject matter. For purpose of illustration, a single louver 114 is depicted in relation to the top and bottom rails 120, 122 of one of the shutter panels. However, as noted above, it should be appreciated that any number of louvers 114 may be positioned between the top and bottom rails 120, 122, with each louver 114 being rotatable relative to the associated frame 112 (FIGS. 1 and 2) across the same angular travel range.

As shown in FIG. 3, the angular travel range of the louver 114 incorporates a fully opened louver position (e.g., the angular position represented by line A in FIG. 3) and extends from such fully opened position A in a first pivot or tilt direction (indicated by arrow 130 in FIG. 3) to a first fully closed louver position (e.g., the angular position represented by line C1 in FIG. 3) and in a second pivot or tilt direction (indicated by arrow 132 in FIG. 3) to a second fully closed louver position (e.g., the angular position represented by line C2 in FIG. 3). Thus, it should be appreciated that the angular travel range generally encompasses a plurality of louver positions spanning between the first and second fully closed positions C1, C2.

In several embodiments, the angular travel range may be divided into a plurality of angular sub-ranges, with each angular sub-range incorporating a different range of louver positions across the angular travel range. For instance, in the illustrated embodiment, the angular travel range has been subdivided into three angular ranges, namely a first angular range 140 incorporating the fully opened position A (e.g., by being centered about the fully opened position A), a second angular range 142 extending from the first angular range 140 in the first tilt direction 130 to the first closed position C1, and a third angular range 144 extending from the first angular range 140 in the second tilt direction 132 to the first closed position C1. As will be described in greater detail below, the first angular range 140 of louver positions may, in certain embodiments, correspond to a non-automatic louver closure range across which each louver 114 is configured to remain in the position in which it is placed (e.g., by a user) until a subsequent user-initiated force is applied to rotate the louver 114 to a different position. For instance, when the louver 114 is rotated by a user to a louver position within the non-automatic louver closure range 140, the louver 114 may, in one embodiment, be configured to remain at such louver position until the user provides an additional input to again rotate the louver 114.

Additionally, the second and third angular ranges 142, 144 of louver positions may, in certain embodiments, correspond to automatic louver closure ranges across which the louver 114 is configured to be automatically actuated or rotated into the corresponding closed position C1, C2. For instance, as will be described in greater detail below, when the louver 114 is rotated (e.g., by a user) to a louver position within the second angular range 142 of louver positions, a louver closure assembly (not shown in FIG. 3) of the associated shutter panel may be operable to drive or rotate the louver 114 to the first closed position C1 without any further user input or additional outside force being applied to the shutter panel. Similarly, when the louver 114 is rotated (e.g., by a user) to a louver position within the third angular range 144 of louver positions, the louver closure assembly may be operable to drive or rotate the louver 142 of louver positions to the second closed position C2 without any further user input or additional outside force being applied to the shutter panel.

As shown in FIG. 3, in one embodiment, a first transition louver position (e.g., the angular position represented by line B1 in FIG. 3) is defined at the adjacent endpoints or the intersection of the first and second angular ranges 140, 142, while a second transition louver position (e.g., the angular position represented by line B2 in FIG. 3) is defined at the adjacent endpoints or the intersection of the first and third angular ranges 140, 144. As will be described below, each transition louver position B1, B2 may correspond to the louver position at or beyond which the disclosed louver closure assembly is configured to initiate automatic closure of the louvers 114. Thus, as each louver 114 is rotated in the first tilt direction 130 from a louver position within the first angular range 140 to the first transition louver position B1 (or to the next louver position immediately past the first transition louver position B1 within the second angular range 142), the louver closure assembly may operate to rotationally drive the louvers 114 to the first closed position C1. Similarly, as each louver 114 is rotated in the second tilt direction 132 from a louver position within the first angular range 140 to the second transition louver position B2 (or to the next louver position immediately past the second transition louver position B2 within the third angular range 144), the louver closure assembly may operate to rotationally drive the louvers 114 to the second closed position C1.

It should be appreciated that the above described angular ranges 140, 142, 144 of louver positions and associated transition louver positions B1, B2 are illustrated to provide one example of suitable angular ranges and transition positions that can be defined across the angular travel range of the louvers 114. In other embodiments, the angular travel range of the louvers 114 may be sub-divided in any other suitable manner, such as by including any number of angular ranges and associated transition positions.

It should also be appreciated that the specific range of angles associated with each angular range 140, 142, 144 of louver positions may generally vary depending on the desired operation of the associated shutter panel. However, in one embodiment, each of the second and third angular ranges 142, 144 may, for example, span across an angular range θ of less than about 25 degrees, such as less than about 20 degrees or less than about 18 degrees, or less than about 15 degrees and/or any other suitable sub-ranges therebetween, including any sub-range(s) defined within such range(s) in increments of 0.5 degrees. In another embodiment, each of the second and third angular ranges 142, 144 may span across an angular range θ of less than about 25 degrees and greater than zero degrees, such as an angular range θ of less than about 25 degrees and/or greater than about 5 degrees, or an angular range θ of less than about 20 degrees and/or greater than about 10 degrees, or an angular range θ of less than about 18 degrees and/or greater than about 12 degrees, and/or any other suitable sub-ranges therebetween, including any sub-range(s) defined within such range(s) in increments of 0.5 degrees. In such an embodiment, the first angular range 140 may, for example, span across an angular range β of less than 180 degrees and/or greater than about 120 degrees, such as an angular range β of less than about 170 degrees and/or greater than about 120 degrees, or an angular range β of less than about 160 degrees and/or greater than about 120 degrees, or an angular range β of less than about 150 degrees and/or greater than about 130 degrees, and/or any other suitable sub-ranges therebetween, including any sub-range(s) defined within such range(s) in increments of 0.5 degrees.

It should also be appreciated that, when the louvers 114 are moved to one of the fully closed positions C1, C2, each louver 114 may be offset from a vertical plane bisecting the top and bottom rails 120, 122 by an offset angle φ, which may generally vary depending on the configuration of the shutter panel. For instance, the offset angle φ may be less than 10 about degrees, such an offset angle φ of less than about 9 degrees or less than about 8 degrees or less than about 7 degrees and/or any other suitable sub-ranges therebetween, including any sub-range(s) defined within such range(s) in increments of 0.2 degrees. In another embodiment, the offset angle φ may be less than 10 about degrees and greater than zero degrees, such an offset angle φ greater than about 2 degrees and/or less than about 9 degrees or an offset angle φ greater than about 4 degrees and/or less than about 8 degrees and/or any other suitable sub-ranges therebetween, including any sub-range(s) defined within such range(s) in increments of 0.2 degrees. As is generally understood, such offset angle φ typically varies based on the thickness of the louvers 114 and the amount of vertical overlap between adjacent louvers 114 when the louvers 114 are moved to one of the closed positions C1, C2.

Figure 4:
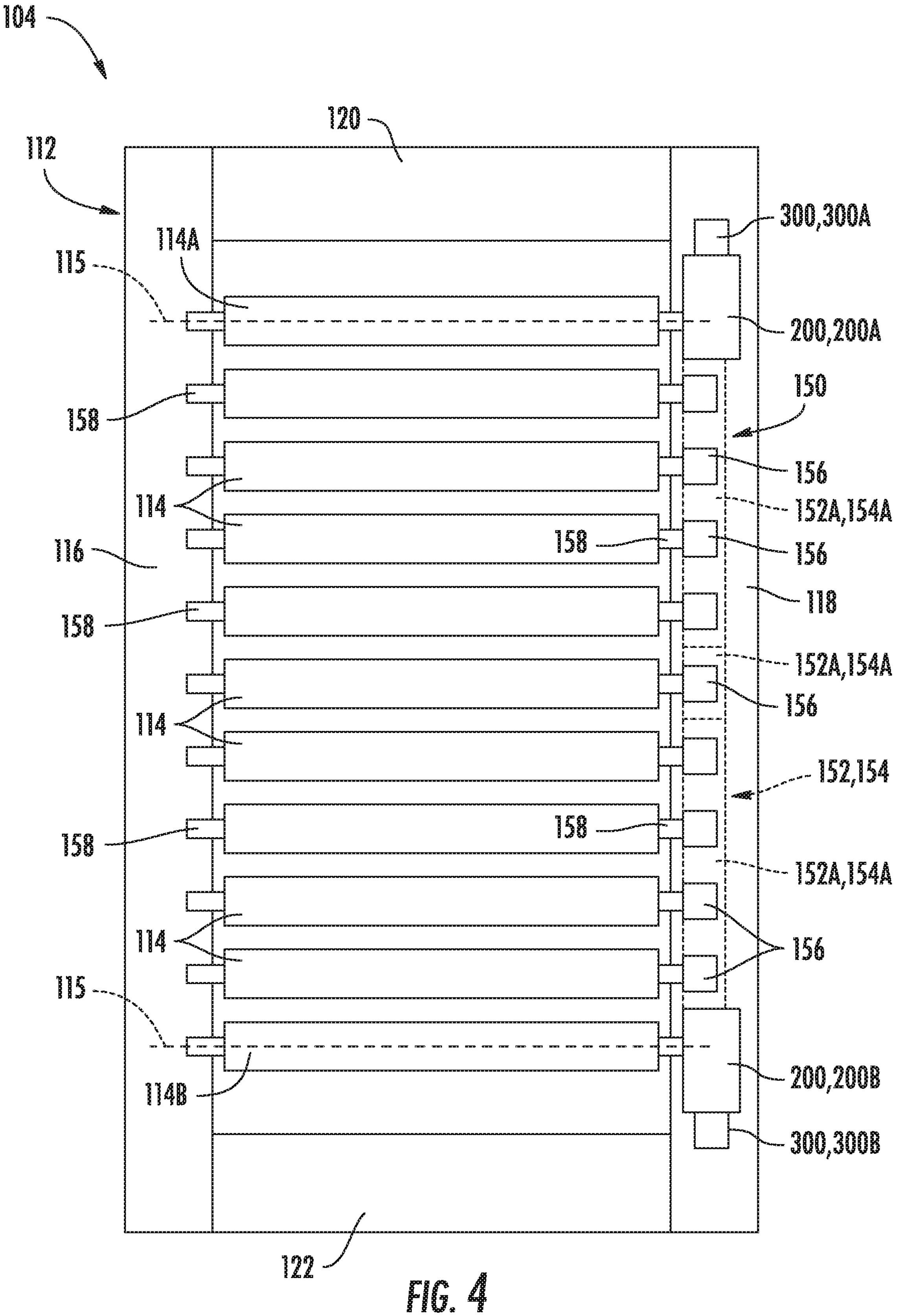
FIG. 4 illustrates a schematic view of an illustrative embodiment of a shutter panel in accordance with aspects of the present subject matter, particularly illustrating the panel including one or more louver closure assemblies and related dampers.

Referring now to FIG. 4, a simplified, schematic view of one embodiment of a shutter panel 104, which may, for example, correspond to one of the shutter panels 104A, 104B described above with reference to FIGS. 1 and 2, is illustrated in accordance with aspects of the present subject matter. As indicated above with reference to FIGS. 1 and 2, the shutter panel 104 may include a frame 112 (e.g., including first and second vertically extending stiles 116, 118 and top and bottom rails 120, 122 extending horizontally between the stiles 116, 118) and a plurality of louvers 114 rotatably coupled to the frame 112 (e.g., via the opposed stiles 116, 118).

In addition, the shutter panel 104 may include a louver tilt assembly 150 operatively coupled to the louvers 114 and configured to provide a connection between the various louvers 114 such that the louvers 114 rotate simultaneously or in unison with one another. As shown in FIG. 4, in one embodiment, the louver tilt assembly 150 may be positioned within a portion of the frame 112, such as by extending vertically within one of the stiles 116, 118 (e.g., the second stile 118). As a result, the louver tilt assembly 150 may correspond to an internal component of the shutter panel 104 that is hidden from view.

In several embodiments, the louver tilt assembly 150 may be configured as a gear rack assembly. For instance, as shown in FIG. 4, the louver tilt assembly 150 includes first and second gear racks 152, 154 (only one of which can be seen in FIG. 4; see, for example, FIG. 17, which shows both racks 152, 154 positioned relative to each other) extending vertically within one the stiles 116, 118 (e.g., within the second stile 118) and a plurality of louver tilt gears 156 configured to mesh with the first and second gear racks 152, 154, with each louver tilt gear 156 being coupled to a respective one of the louvers 114 (e.g., via an associated louver pin 158) for rotation therewith. In such an embodiment, the louver tilt assembly 150 may be configured to convert linear translation of the first and second gear racks 152, 154 within the stile 118 (e.g., in opposed vertical directions) into rotational motion of the louvers 114 and vice versa. For instance, as one of the louvers 114 is rotated, the louver tilt gear 156 coupled to such louver 114 may similarly rotate in the same direction, thereby resulting in opposed linear actuation or translation of the gear racks 152, 154 within the frame 112 due to the meshed engagement between the louver tilt gear 156 and the racks 152, 154. Such linear translation of the gear racks 152, 154, in turn, results in rotational motion of the remainder of the louver tilt gears 156 and associated louvers 114 coupled thereto, thereby allowing all of the louvers 114 to rotate in unison. It should be appreciated that, in the illustrated embodiment, the linear translation of the gear racks 152, 154 is in a direction perpendicular to the longitudinal axis or axis of rotation 115 of the louvers 114.

It should also be appreciated that, in one embodiment, each gear rack 152, 154 may correspond to a continuous rack extending vertically within the frame 112. Alternatively, as shown in FIG. 4, each gear rack 152, 154 may be divided into two or more rack segments 152A, 154A extending vertically within the frame 112. In such an embodiment, adjacent rack segments 152A, 154A forming each gear rack 152, 154 may be coupled to each other (e.g., end-to-end) within the frame 112 to create an assembly of rack segments configured to linearly translate relative to the opposed gear rack with rotation of the louvers 114. For instance, as will be described below, adjacent rack segments 152A, 154A may be coupled to each other using suitable connection features (e.g., male/female connection features) to allow the rack segments 152A, 154A to be quickly and effectively secured together.

Additionally, the shutter panel 104 may include one or more louver closure assemblies 200 operable to automatically actuate or rotationally drive the louvers 114 to their closed positions C1, C2 (FIG. 3) depending on the current angular position of such louvers 114. For example, as indicated above with reference to FIG. 3, the louvers 114 may be rotatable about their longitudinal axes across an angular travel range including a first angular range 140 of louver positions (e.g., corresponding to a non-automatic louver closure range) and second and third angular ranges 140, 142 of louver positions (e.g., corresponding to automatic louver closure ranges). In such an embodiment, when the louvers 114 are moved from a position within first angular range 140 of louver positions to a position within one of the second or third angular ranges 142, 144 of louver positions, the louver closure assembly(ies) 200 may function to automatically drive the louvers 114 to the associated closed position C1, C2. However, when the louvers 114 are moved to a position within the first angular range 140 of louver positions, the louver closure assembly(ies) 200 may not function to automatically close the louvers 114, thereby allowing the louvers 114 to be maintained at a user-selected position.

As shown in FIG. 4, in one embodiment, the shutter panel 104 includes first and second louver closure assemblies 200A, 200B. Specifically, in the illustrated embodiment, the first and second louver closure assemblies 200A, 200B are located within the frame 112 (e.g., within the second stile 118) at the top and bottom ends of the louver tilt assembly 150 such that the first louver closure assembly 200A is provided in operative association with the uppermost louver 114A of the shutter panel 104 and the second louver closure assembly 200B is provided in operative association with the lowermost louver 114B of the shutter panel 104. However, the shutter panel 104 may, instead, include a single louver closure assembly or three or more louver closure assemblies. Moreover, the positioning of the louver closure assembly (ies) need not be limited to the top end and/or bottom end positions shown in FIG. 4. For instance, as will be described below, a louver closure assembly may be positioned at any location along the height of the shutter panel 104 that allows the louver closure assembly to be provided in operative association with one of the louvers 114.

In several embodiments, the louver closure assemblies 200 may be coupled to and/or otherwise provided in operative association with the louver tilt assembly 150. For instance, in the illustrated embodiment, the first and second louver closure assemblies 200A, 200B may form or function as upper and lower extensions, respectively, of the louver tilt assembly 150. In such an embodiment, each louver closure assembly 200A, 200B may include suitable components for allowing the respective louver 114A, 114B connected thereto to be coupled to the remainder of the louvers 114 for simultaneous rotation. For example, as will be described below with reference to FIGS. 5-9, each louver closure assembly 200A, 200B may include a rack section configured to mesh with a corresponding louver tilt gear coupled to the associated louver 114A, 114B. As such, by coupling the first and second louver closure assemblies 200A, 200B to the top and bottom ends of the gear racks 152, 154 of the louver tilt assembly 150, the louver closure assemblies 200A, 200B may linearly translate with the racks 152, 154 to allow simultaneous rotation of the uppermost and lowermost louvers 114A, 114B with the remainder of the louvers 114. For instance, similar to the racks 152, 154, the louver closure assemblies 200A, 200B may be configured translate linearly along a movement path extending perpendicular to the axis of rotation (indicated by point 115 in FIG. 5) of the louvers 114.

Moreover, by providing the louver closure assemblies 200 with similar drive or tilt-related components as those included within the louver tilt assembly 150, the louver tilt assembly 150 may, in certain embodiments, be configured as a modular system, with each louver closure assembly 200, for example, being interchangeable with other components of the louver tilt assembly 150. For instance, in embodiments in which each gear rack 152, 154 comprises an assembly of rack segments 152A, 154A, side-by-side rack segments 152A, 154A of the first and second gear racks 152, 154 that are configured to mesh with a given louver tilt gear 156 of the louver tilt assembly 150 may be removed and replaced with a louver closure assembly 200. In such instance, in addition to functioning as an automatic louver closing feature for the shutter panel 104, the louver closure assembly 200 may also function to rotationally drive the associated louver tilt gear 156 with corresponding linear translation of the adjacent rack segments 152A, 154A. As will be described below, to allow for such modularity, a common connection interface (e.g., a common male/female interface) may be provided for both the rack segments 152A, 154A and the components of each louver closure assembly 200.

Referring still to FIG. 4, the shutter panel 104 also include one or more dampers 300 configured to resist or slow the rate of rotation of the louvers 114, particularly as the louvers 114 are being moved to their fully closed positions C1, C2 (FIG. 3). Specifically, in several embodiments, a damper 300 may be provided in operative association with at least one of the louver closure assemblies 200 to dampen motion of the assembly 200 as it functions to automatically rotate the louvers 114 to one of the closed positions C1, C2, which, in turn, results in the rate of rotation of the louvers 114 being reduced to allow for automatic louver closure in a smooth, controlled manner. However, when the louver closure assembly 200 is not functioning to automatically close the louvers 114, the damper 300 may allow for un-inhibited or non-damped louver rotation. For instance, as will be described below, the damper 300 may be selectively engaged with the associated louver closure assembly 200 depending on the angular position of the louvers 114 such that the damper 300 only acts to resist rotation of the louvers 114 during automatic closure. Thus, for example, as the louvers 114 are being rotated across the first angular range 140 (FIG. 3) of louver positions (e.g., the non-automatic louver closure range), the damper 300 may be disengaged from or may otherwise not act on the associated louver closure assembly 200, thereby providing un-inhibited or non-damped louver rotation. However, as the louvers 114 are rotated into one of the second or third angular range 142, 144 (FIG. 3) of louver positions, the damper 300 may engage the associated louver closure assembly 200 to restrict or slow the rotation of the louvers 114 towards their closed position C1, C2.

As shown in the illustrated embodiment, the shutter panel 104 includes a damper 300 in operative association with each louver closure assembly 200. Specifically, a first damper 300A is mounted within the frame 112 adjacent to the first louver closure assembly 200A (e.g., at the top of the second stile 118 or within the top rail 120) to allow the first damper 300A to selectively dampen motion of the first louver closure assembly 200A, while a second damper 300A is mounted within the frame 112 adjacent to the second louver closure assembly 200A (e.g., at the bottom of the second stile 118 or within the bottom rail 122) to allow the second damper 300A to selectively dampen motion of the second louver closure assembly 200A. However, in other embodiments, a damper 300 may only be provided in operative association with one of the louver closure assemblies 200, such as the first louver closure assembly 200A or the second louver assembly 200B.

As will be described below, in several embodiments, each damper 300 may be configured as a linear damper. In such embodiments, each damper 300 may, for example, utilizes a working medium or fluid (e.g., a gas or liquid) to provide smooth, controlled deceleration of the linearly translating components of the adjacent louver closure assembly 200. For instance, in one embodiment, each damper 300 may comprise a dashpot damper that is configured to come into contact with or otherwise engage a linearly translating component of the adjacent louver closure assembly 200 when the louver closure assembly 200 is functioning to automatically close the louvers 114. Alternatively, each damper 300 may comprise any other suitable damping mechanism that allows such damper 300 to function as described herein. For instance, in one alternative embodiment, each damper 300 may simply comprise a compressible material (e.g., a foam-cell material) that is configured to compress when the damper 300 comes into contact with or otherwise engages a linearly translating component of the adjacent louver closure assembly 200.

Figure 5:
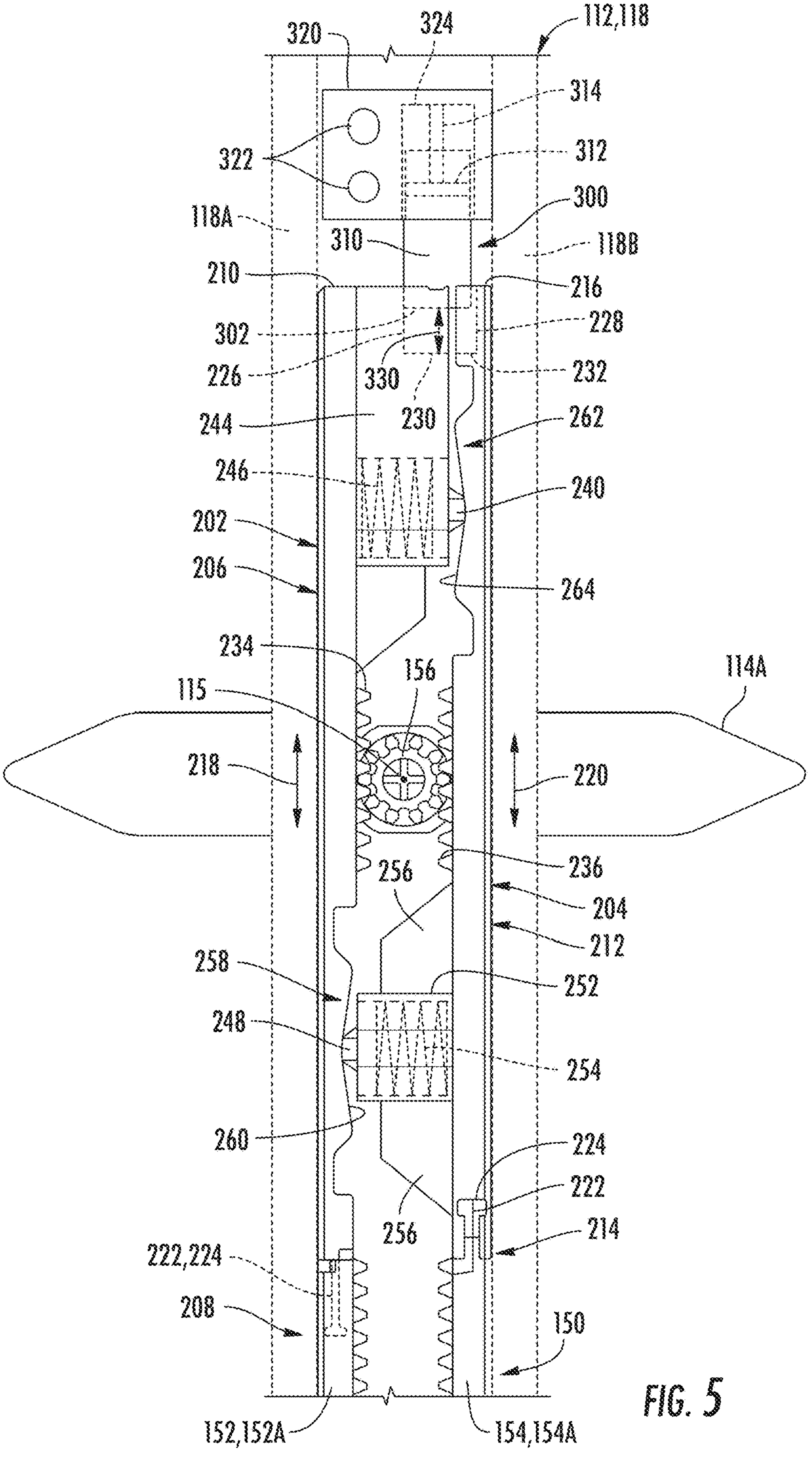
FIG. 5 illustrates a side view of one illustrative embodiment of a louver closure assembly and related damper as installed relative to adjacent components of a shutter panel in accordance with aspects of the present subject matter, particularly illustrating the relative positioning of the components of the louver closure assembly and related damper when the louvers of the shutter panel are at the fully opened position.

Referring now to FIGS. 5-9, several views of one illustrative embodiment of a louver closure assembly 200 are illustrated in accordance with aspects of the present subject matter. Specifically, FIG. 5 illustrates the louver closure assembly 200 installed relative to adjacent components of a shutter panel, while FIGS. 6-9 illustrate differing views of components of the louver closure assembly 200. For purposes of description, the louver closure assembly 200 of FIGS. 5-9 will generally be described as corresponding to the first louver closure assembly 200A shown in FIG. 4. However, it should be appreciated that the second louver closure assembly 200B may have the same or similar configuration as that shown in FIGS. 5-9.

In several embodiments, the louver closure assembly 200 includes first and second actuators 202, 204 configured to be assembled side-by-side within the interior of the shutter frame 112 relative to an associated louver of the shutter panel 104. For instance, as illustrated in FIG. 5, the first and second actuators 202, 204 are shown as installed within the interior space defined between opposed first and second sidewalls 118A 118B, respectively, of one of the stiles of the shutter frame 112 (e.g., the second stile 118) at a location adjacent to the uppermost louver 114A of the shutter panel 104. However, in other embodiments, the actuators 202, 204 may be installed at any other suitable location that allows the louver closure assembly 200 to function as described herein.

As will be described below, each actuator 202, 204 may include one or more features (e.g., a gear rack section) for coupling the louver closure assembly 200 to the adjacent louver 114A in a manner that allows linear translation of the actuators 202, 204 to be converted into rotational motion of the louver 114A and vice versa. In addition, each actuator 202, 204 may include one or more features (e.g., male/female interface components/features) for coupling the actuator 202, 204 to an adjacent component of the louver tilt assembly 150 (e.g., an adjacent rack segment 152A, 154A of one of the gear racks 152, 154), thereby allowing linear translation of the actuators 202, 204 to be transferred to the gear racks 152, 154 and vice versa. As such, rotation of any louver 114 of the shutter panel 104 may result in simultaneous linear translation of both the gear racks 152, 154 and the actuators 202, 204, which, in turn, causes simultaneous rotation of the remainder of the louvers 114 of the shutter panel 104. Moreover, in accordance with aspects of the present subject matter, each actuator 202, 204 may include one or more auto-closure features that allow the louver closure assembly 200 to facilitate automatic closure of the louvers 114. For instance, as will be described below, each actuator 202, 204 may, in one embodiment, include a component or feature configured to be biased into engagement with a corresponding component or feature of the other actuator in a manner that results in automatic linear actuation or translation of the louver tilt assembly 150 upon rotation of the louvers 114 into one of the associated automatic closure ranges (e.g., the second and third angular ranges 142, 144 (FIG. 3) of louver positions), thereby resulting in the louvers 114 being rotationally driven into the corresponding closed position C1, C2 (FIG. 3).

Figure 6:
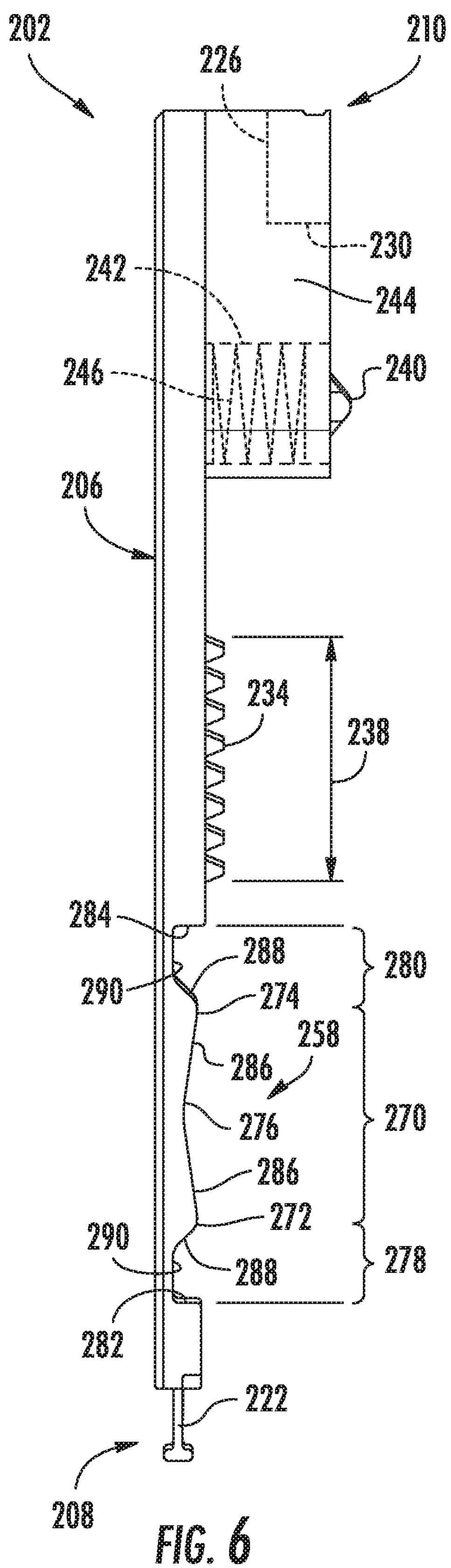
FIG. 6 illustrates a side view of a first actuator component of the louver closure assembly shown in FIG. 5 in accordance with aspects of the present subject matter.
Figure 7:
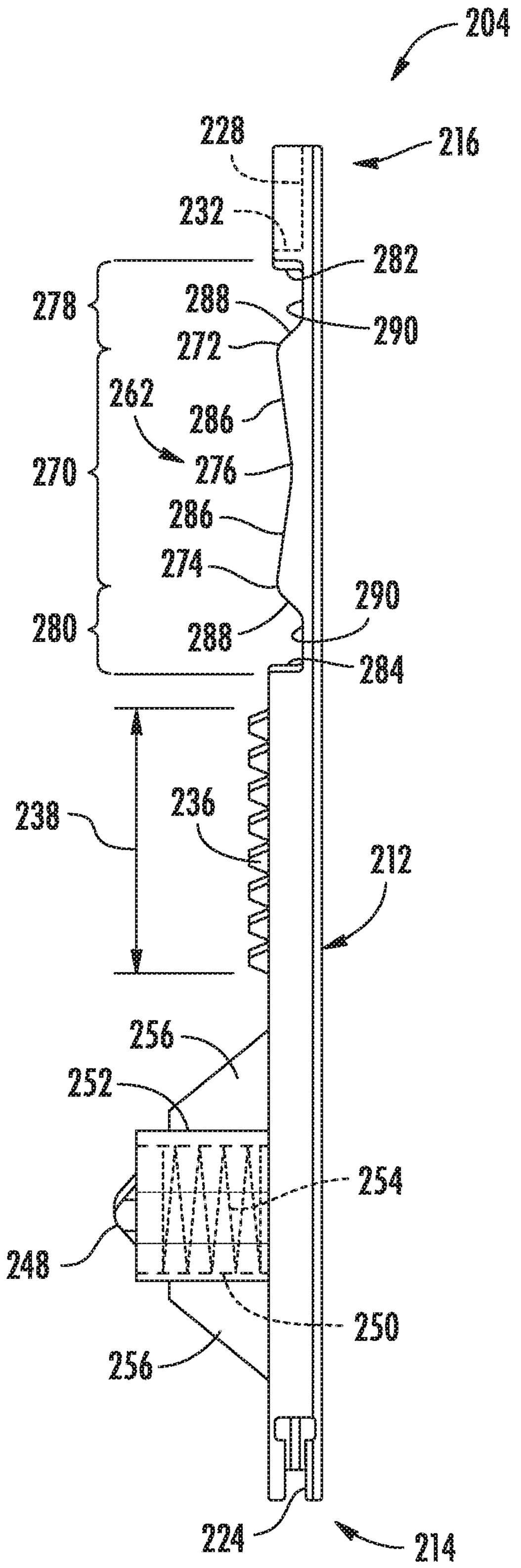
FIG. 7 illustrates a side view of a second actuator component of the louver closure assembly shown in FIG. 5 in accordance with aspects of the present subject matter.
Figure 8:
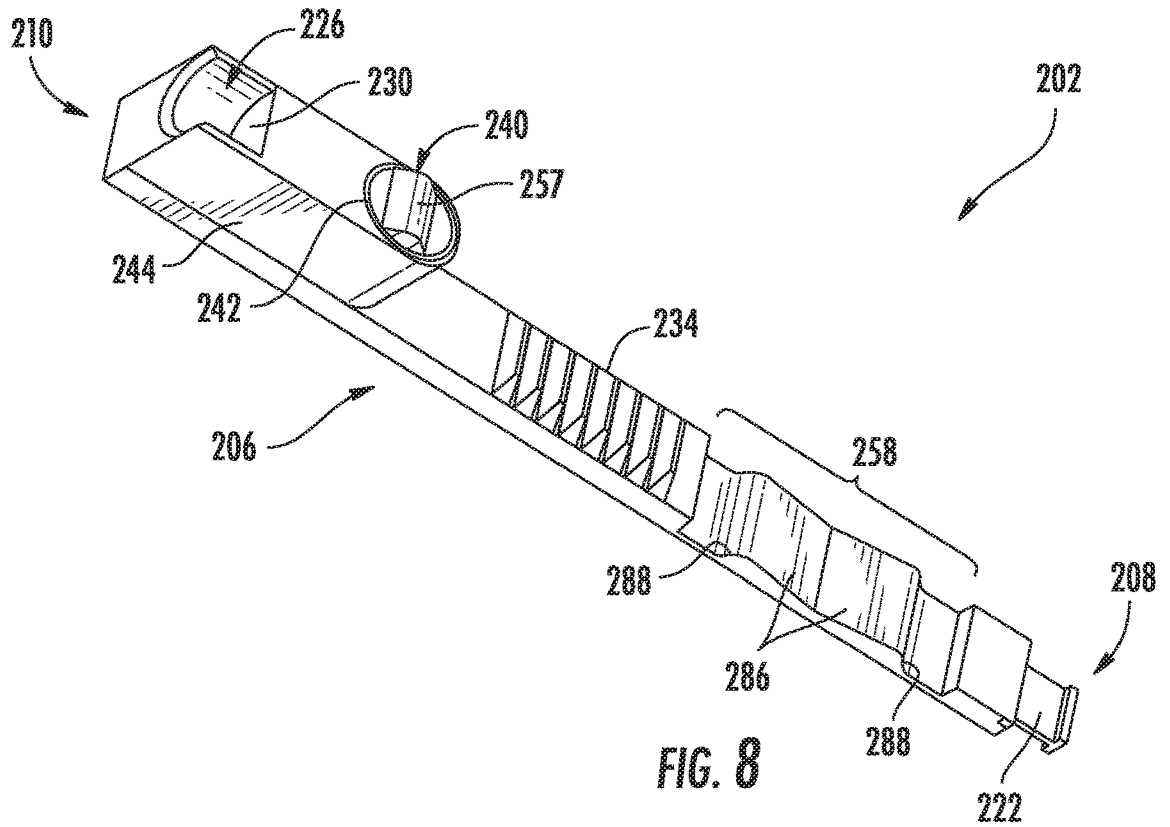
FIG. 8 illustrates a perspective view of the first actuator component shown in FIG. 6 in accordance with aspects of the present subject matter.

As particularly shown in FIGS. 5, 6, and 8, the first actuator 202 of the louver closure assembly 200 includes a first actuator bar 206 extending lengthwise between a first end 208 and an opposed second end 210 of the actuator 202. Additionally, as particularly shown in FIGS. 5, 7, and 9, the second actuator 204 of the louver closure assembly 200 includes a second actuator bar 212 extending lengthwise between a first end 214 and an opposed second end 216 of the actuator 204. In several embodiments, the actuators 202, 204 may be configured to be oriented vertically within the shutter frame 112 such that each actuator bar 206, 212 generally extends lengthwise between its opposed ends along a vertical plane. In one embodiment, each vertical plane may, in turn, define or extend parallel to a corresponding translation plane along which each actuator 202, 204 is configured to linearly translate with rotation of the louvers 114. For instance, as shown in FIG. 5, the first actuator bar 206 may be configured to translate linearly within the frame 112 along the vertically extending first sidewall 118A of the stile 118 (e.g., in the direction of arrow 218 in FIG. 5) while the second actuator bar 212 may be configured to translate linearly within the frame 122 along the vertically extending second sidewall 118B of the stile 118 (e.g., in the direction of arrow 220 in FIG. 5), with both directions 218, 220 extending generally perpendicular to the axis of rotation 115 (FIG. 5) of the louvers 114.

Figure 9:
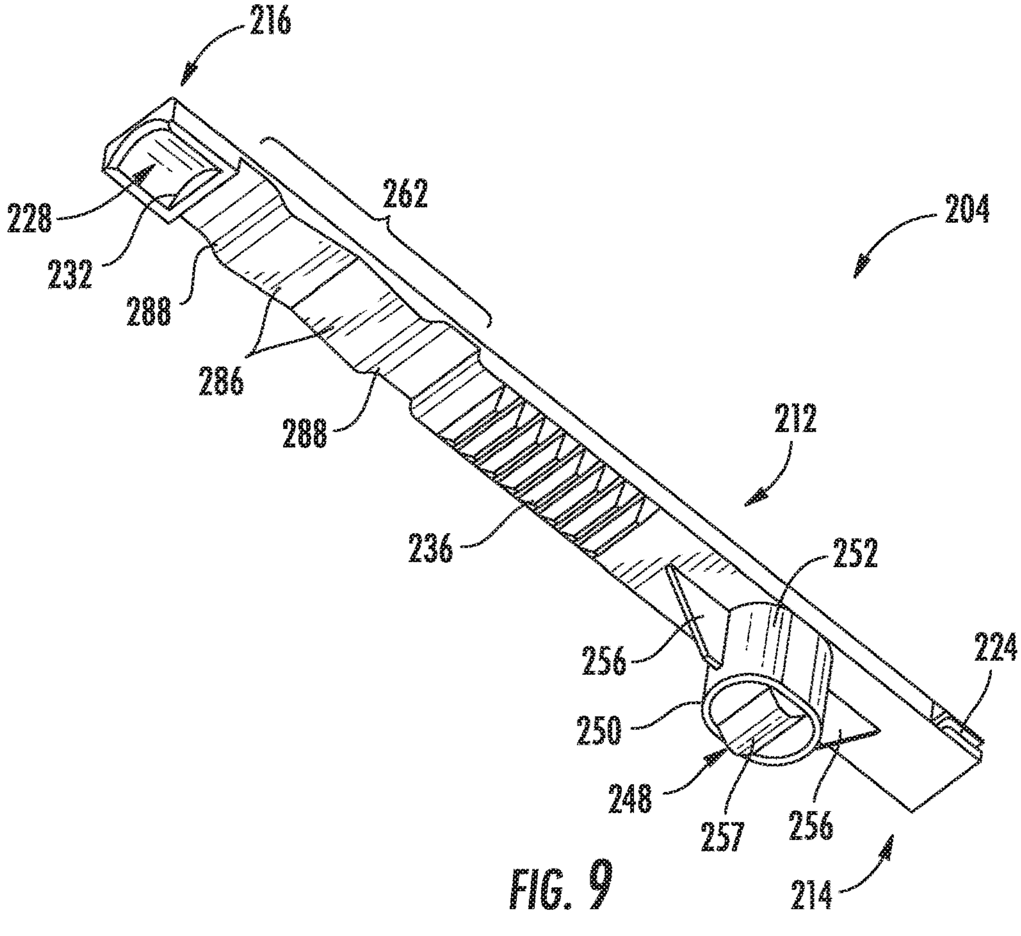
FIG. 9 illustrates a perspective view of the second actuator component shown in FIG. 7 in accordance with aspects of the present subject matter.

In several embodiments, the first end 208, 214 of each actuator bar 206, 212 may correspond to an interface end or connection end of the respective actuator 202, 204 that is configured to be coupled to an adjacent component of the louver tilt assembly 150. For instance, the first end 208 of the first actuator bar 206 may be configured to be coupled to an adjacent rack segment of one of the gear racks of the louver tilt assembly 150 (e.g., the first gear rack 152) to allow the first actuator 202 to translate within the frame 112 with movement of the associated gear rack 152. Similarly, the first end 214 of the second actuator bar 212 may be configured to be coupled to an adjacent rack segment of the other gear rack of the louver tilt assembly 150 (e.g., the second gear rack 154) to allow the second actuator 204 translate within the frame 112 with movement of such gear rack 154. In such an embodiment, the first ends 208, 214 of the actuator bars 206, 212 may be configured to be coupled to the adjacent rack segments 152A, 154A using any suitable mechanical coupling or connection means that allows such components to translate together within the frame 112. For instance, in the illustrated embodiment, the first ends 208, 214 of the actuator bars 206, 212 are configured for coupling to the adjacent rack segments 152A, 154A via a male/female connection arrangement. Specifically, as shown in FIGS. 5, 6, and 8, the first actuator bar 206 includes a shaped projection 222 at its first end 208 (e.g., a T-shaped projection) that is configured to be received within a correspondingly shaped recess 224 (FIG. 5) (e.g., a T-shaped recess) formed within the adjacent rack segment 152A of the first gear rack 152. Similarly, as shown in FIGS. 5, 7, and 9, the second actuator bar 212 includes a shaped recess 224 defined at its first end 214 (e.g., a T-shaped recess) that is configured to receive a correspondingly shaped projection 222 (FIG. 5) (e.g., a T-shaped projection) extending from the adjacent rack segment 154A of the second gear rack 154. However, it should be appreciated that, in other embodiments, the first ends 208, 214 of the actuator bars 206, 212 may be configured to be coupled to the adjacent rack segments 152A, 154A in any other manner, such as by using a different male/female connection arrangement and/or by using suitable mechanical fasteners, adhesives, and/or the like.

Additionally, in several embodiments, the second end 210, 216 of each actuator bar 206, 212 may correspond to a damper end of the respective actuator 202, 204 that is configured to selectively engage the adjacent damper 300 (FIG. 5) of the shutter panel 104 when the louver closure assembly 200 is functioning to automatically close the louvers 114. Specifically, as shown in FIGS. 8 and 9, the first actuator bar 206 defines a first damper channel 226 at its second end 210, and the second actuator bar 212 defines a second damper channel 228 at its second end 216, with each damper channel 226, 228 being configured to receive at least a portion of the damper 300 depending on the relative positioning between the damper 300 and the respective actuator 202, 204. Moreover, a recessed contact surface 230, 232 (FIGS. 8 and 9) is defined at the end of each damper channel 226, 228 that is configured for selective engagement with a contact end 302 (FIG. 5) of the damper 300. For instance, as particularly shown in FIG. 8, a first contact surface 230 is provided at the inner end of the first damper channel 226 such that the first contact surface 230 is recessed relative to the second end 210 of the first actuator bar 206. Similarly, as particularly shown in FIG. 9, a second contact surface 232 is provided at the inner end of the second damper channel 228 such that the second contact surface 232 is recessed relative to the second end 216 of the second actuator bar 212. As will be described below, depending on the direction of rotation of the louvers 114, either the first actuator 202 or the second actuator 204 may be configured to engage the damper 300 (i.e., via contact between its respective contact surface 230, 232 and the contact end 302 of the damper 300) as automatic louver closure is being initiated with rotation of the louvers 114 into their associated automatic louver closure range. Such engagement between the damper 300 and the adjacent actuator 202, 204 results in a slowing or reduction of the rate of linear translation of the actuators 202, 204 within the frame 112, which, in turn, slows or reduces the rate of rotational motion of the louvers 114 towards their closed position C1, C2 (FIG. 3).

It should be appreciated that, as indicated above, the damper 300 may, in several embodiments, correspond to a linear damper. For instance, as shown in FIG. 5, the damper is configured as a dashpot damper. In such an embodiment, the damper may include, for example, a cylinder 310 defining a fluid-filled chamber, a piston 312 positioned within the cylinder 310, and a rod 314 coupled to and extending from the piston 312 to a location outside the cylinder 310. As such, when the cylinder 310 is actuated relative to the piston/rod 312, 314 (or vice versa), the fluid contained within the chamber may dampen such relative linear actuation of the components. In the illustrated embodiment, the contact end 302 of the damper 300 is defined by the cylinder 310. Thus, as one of the actuators 202, 204 is moved against and into engagement with the contact end 302 of the damper 300, the cylinder 310 may be actuated relative to the piston/rod 312, 314 to allow a resistive, damping force to be applied to the louver closure assembly 200. However, in other embodiments, the orientation of the damper 300 may be reversed, with the rod 314 defining the contact end 302 of the damper 300 such that the piston/rod 312, 314 are actuated relative to the cylinder 310 as one of the actuators 202, 204 is moved against and into engagement with the contact end 302 to allow a resistive, damping force to be applied to the louver closure assembly 200.

Additionally, as shown in FIG. 5, in one embodiment, the damper 300 may be installed relative a damper mounting block 320, which is configured to support the damper 300 within the interior of the shutter frame 112. For instance, the mounting block 320 may define fastener openings 322 (FIG. 5) for coupling the block 320 to the adjacent portion of the frame 112 (e.g., the second stile 118). Moreover, as shown in FIG. 5, the mounting block 320 may define an opening or channel 324 within which the damper 300 is configured to be installed.

As indicated above, each actuator 202, 204 may also include one or more louver engagement features. For instance, in several embodiments, each actuator 202, 204 may include a gear rack section including a plurality of gear teeth configured to mesh with an associated louver tilt gear 156 (FIG. 5) coupled to the adjacent louver 114A. Specifically, as shown in FIGS. 5-9, the first actuator 202 includes a first rack section 234 coupled to or formed integrally with the first actuator bar 206 at a location between the first and second ends 208, 210 of the bar 206, while the second actuator 204 includes a second rack section 236 coupled to or formed integrally with the second actuator bar 212 at a location between the first and second ends 214, 216 of the bar 212. In the illustrated embodiment, the rack sections 234, 236 are generally positioned at the same relative locations along their respective actuator bars 206, 212 (e.g., by being centrally located between the opposed ends of each actuator bar 206, 212). Thus, as shown in FIG. 5, when the first and second actuators 202, 204 are installed relative to each other, the first and second racks sections 234, 236 may generally be aligned with each other, with the adjacent louver tilt gear 156 being positioned directly between the opposed rack sections 234, 236. In addition, each rack section 234, 236 may define a rack length 238 (FIGS. 6 and 7) selected based on the desired angular travel range of the louvers 114 such that, for example, the rack length 238 is equal to or greater than the distance associated with the amount of linear translation required by the actuators 202, 204 to rotate the louvers 114 across their full angular travel range (i.e., from the first closed position C1 (FIG. 3) to the second closed position C2 (FIG. 3)). As such, with the louver tilt gear 156 aligned between the rack sections 234, 236 when the associated louver 114A is located at its fully opened position (e.g., by being aligned with the centers of the rack sections 234, 236 as shown in FIG. 5), the louver 114A may be rotated fully from the fully opened position A (FIG. 3) to either the first closed position C1 (FIG. 3) or the second closed position C2 (FIG. 3) to linearly translate the first and second actuators 202, 204 in opposed directions relative to the louver tilt gear 156.

Referring still to FIGS. 5-9, as indicated above, the actuators 202, 204 may also include one or more features that allow the louver closure assembly 200 to facilitate automatic closure of the louvers 114. For instance, in several embodiments, each actuator 202, 204 may include a follower member configured to be biased into engagement with a corresponding engagement section of the other actuator. In such an embodiment, the engagement section of each actuator 202, 204 may include an engagement or cam surface defining a cam profile across which the corresponding follower member of the other actuator rides as the actuators 202, 204 linearly translate relative to each other with rotation of the louvers 114. As a result, by appropriately configuring the shape or arrangement of the cam profiles, each follower member may engage its respective engagement section in a manner that results in automatic linear actuation or translation of the louver tilt assembly 150 upon rotation of the louvers 114 into one of the associated automatic louver closure ranges (i.e., the second and third angular ranges 142, 144 (FIG. 3) of louver positions), thereby resulting in the louvers 114 being rotationally driven into the adjacent closed position C1, C2 (FIG. 3).

For instance, as shown in the illustrated embodiment, the follower member of each actuator 202, 204 is configured as a plunger. Specifically, as shown in FIGS. 5, 6, and 8, the first actuator 202 includes a first plunger 240 positioned within a plunger opening 242 (FIG. 8) defined by a plunger housing 244 of the actuator 202 that is coupled to or formed integrally with the first actuator bar 206. Additionally, a first biasing member, such as a spring 246 (FIGS. 5 and 6), is positioned within the plunger opening 242 between the first plunger 240 and the first actuator bar 206 such that the biasing member biases the plunger 240 outwardly away from the actuator bar 206 (and towards the opposed second actuator 204). Similarly, as shown in FIGS. 5, 7, and 9, the second actuator 204 includes a second plunger 248 positioned within a plunger opening 250 (FIG. 9) defined by a plunger housing 252 of the actuator 204 that is coupled to or formed integrally with the second actuator bar 212, with a second biasing member, such as a spring 254 (FIGS. 5 and 7), being positioned within the plunger opening 250 between the second plunger 248 and the second actuator bar 212 such that the biasing member biases the plunger 248 outwardly away from the actuator bar 212 (and towards the opposed first actuator 202). As particularly shown in FIGS. 8 and 9, each plunger 240, 248 may define a rounded tip 257, which may provide reduced friction between the plunger 240, 248 and the associated engagement section of the opposed actuator 202, 204.

It should be appreciated that the plungers 240, 248 are positioned at opposed sides of the actuators 202, 204 relative to the rack sections 234, 236. Specifically, as shown in FIG. 5, the first plunger 240 is positioned at a location between the first rack section 234 and the second end 210 the first actuator 202, while the second plunger 248 is positioned at a location between the second rack section 236 and the first end 214 of the second actuator 204. As will be described below, such positioning of the plungers 240, 248 may allow each plunger 240, 248 to be aligned with and biased into engagement with a corresponding portion of the opposed actuator 202, 204. Additionally, as shown in the illustrated embodiment, the plunger housings 244, 252 of the actuators 202, 204 have differing configurations. For instance, as shown in FIGS. 5, 6, and 8, the plunger housing 244 of the first actuator 202 is configured as a rectangular shaped block extending from the location of the first plunger 240 to the second end 210 of the actuator 202, which allows the plunger housing 244 to also provide structure for defining the first damper channel 226 at such end 210 of the first actuator 202. In contrast, as shown in FIGS. 5, 7, and 9, the plunger housing 252 of the second actuator 204 is configured as a smaller, oval-shaped block that is generally sized to accommodate the plunger 248, with angled ribs 256 extending from each side of the housing 252 to provide structural support thereto. The smaller profile of the plunger housing 252 and associated ribs 256 may be designed, for example, to provide sufficient clearance between the louver closure assembly 200 and the adjacent components of the louver tilt assembly 150 as such components linearly translate within the frame 112 with rotation of the louvers 114.

As indicated above, each follower member may be configured to be biased into engagement with a corresponding engagement section of the opposed actuator. Specifically, as shown in FIG. 5, the first actuator 202 includes a first engagement section 258 coupled to or formed integrally with the first actuator bar 206 that defines an engagement surface 260 (FIG. 5) against which the second plunger 248 is biased when the actuators 202, 204 are installed relative to each other within the frame 112. Similarly, the second actuator 204 includes a second engagement section 262 coupled to or formed integrally with the second actuator bar 212 that defines an engagement surface 264 (FIG. 5) against which the first plunger 240 is biased when the actuators 202, 204 are installed relative to each other within the frame 112. As will be described below, each engagement section 258, 262 defines a cam profile that varies along the length of the engagement section, with such variations being generally configured to provide the desired functionality of the louver closure assembly 200 depending on the angular position of the louvers 114.

For instance, in several embodiments, each engagement section 258, 262 may include three separate cam profile portions, with each cam profile portion being associated with a corresponding angular range of louver positions for the louvers 114. Specifically, as shown in FIGS. 6 and 7, each engagement section 258, 262 includes a first cam profile portion 270 across which each associated plunger 240, 248 is configured to ride as the actuators 202, 204 translate linearly relative to each other with rotation of the louvers 114 across their first angular travel range 140 (FIG. 3). In general, the first cam profile portion 270 may extend lengthwise across each engagement section 258, 262 between first and second profile transition points 272, 274, with a center 276 of the first cam profile portion 270 being defined equidistant from the opposed transition points 272, 274. In such an embodiment, each plunger 240, 248 may be configured to be positioned at the center 276 of the adjacent first cam profile portion 270 when the louvers 114 are located at their fully opened position A (FIG. 3). As the louvers 114 are rotated from their fully opened position A in the first tilt direction 130 (FIG. 3), each plunger 240, 248 may ride across the adjacent first cam profile portion 270 from its center 276 towards the first profile transition point 272 until the louvers 114 reach their corresponding first louver transition position B1 (FIG. 3), at which point each plunger 240, 248 is configured to be located at the first profile transition point 272 of the respective engagement section 258, 262. Similarly, as the louvers 114 are rotated from their fully opened position A in the second tilt direction 132 (FIG. 3), each plunger 240, 248 may ride across the adjacent first cam profile portion 270 from its center 276 towards the second profile transition point 274 until the louvers 114 reach their corresponding second louver transition position B2 (FIG. 3), at which point each plunger 240, 248 is configured to be located at the second profile transition point 274 of the respective engagement section 258, 262.

Additionally, each engagement section 258, 262 includes second and third cam profile portions 278, 280 (FIGS. 6 and 7) across which each associated plunger 240, 248 is configured to ride as the actuators 202, 204 translate linearly relative to each other with rotation of the louvers 114 across their second and third angular travel ranges 142, 144 (FIG. 3). As shown in FIGS. 6 and 7, the second and third cam profile portions 278, 280 are defined at the opposed ends of the first cam profile portion 270, with the second cam profile portion 278 extending outwardly from the first profile transition point 272 and the third cam profile portion 280 extending outwardly from the second profile transition point 274. In such an embodiment, as the louvers 114 are rotated from their first louver transition position B1 (FIG. 3) in the first tilt direction 130 (FIG. 3), each plunger 240, 248 may ride across the second cam profile portion 278 from the first profile transition point 272 towards an opposed end 282 of second cam profile portion 278 until the louvers 114 reach their first closed position C1 (FIG. 3). Similarly, as the louvers 114 are rotated from their second louver transition position B2 (FIG. 3) in the second tilt direction 132 (FIG. 3), each plunger 240, 248 may ride across the third cam profile portion 280 from the second profile transition point 274 towards an opposed end 284 of third cam profile portion 280 until the louvers 114 reach their second closed position C2 (FIG. 3).

In embodiments in which the various cam profile portions 270, 278, 280 are associated with respective angular ranges of louver positions, the specific surface profile of each cam profile portion 270, 278, 280 may be selected to allow for desired operation of the louver closure assembly 200 within each associated range of louver positions. For instance, as indicated above, when the louvers 114 are rotated to a selected position within the first angular range 140 (FIG. 3) of louver positions (e.g., the non-automatic louver closure range), it may be desirable for the louvers 114 to be maintained at such position until a further user input is provided to again rotate the louvers 114. As such, the surface profile of the first cam profile portion 270 may be adapted to ensure that the louver closure assembly 200 does not function to automatically linearly actuate the louver tilt assembly 150. For example, as shown in FIGS. 6 and 7, each first cam profile portion 270 is characterized by gently sloped inclined surfaces 286 extending from the center 276 of such cam profile portion 270 to each of the profile transition points 272, 274, with the inclined surfaces 286 tapering inwardly towards the center 276 such that the central location defines a "valley" of the first cam profile portion 270 and the profile transition points 272, 274 define "ridges" or "peaks" at the opposed ends of the first cam profile portion 270.

In such an embodiment, given the increased spacing between each first cam profile portion 270 and the opposed actuator 202, 204 at the central location, the friction between the plunger 240, 248 and the adjacent engagement surface 260, 264 (FIG. 5) may be lowest at the center 276 of the first cam profile portion 270 as compared to the remainder of the first cam profile portion 270, thereby allowing the louver closure assembly 200 to provide a lower resistance to movement when the louvers 114 are being rotated across their fully opened position A (FIG. 3). However, as each plunger 240, 248 rides along the first cam profile portion 270 from its center 276 along one of the outwardly inclined surfaces 286, the friction between the plunger 240, 248 and the adjacent engagement surface 260, 264 (FIG. 5) may steadily increase as the biasing force applied to the plunger 240, 248 increases with increased compression of the biasing spring 246, 254. It should be appreciated that the taper angle of each inclined surface 286 may be selected to be sufficiently low so that the plunger 240, 248 does not ride back down the inclined surface 286 towards the center 276 of the first cam profile portion 270 when the louvers 114 are not being rotated, thereby preventing unintended actuation of the louvers 114 back toward the fully opened position A (FIG. 3). It should also be appreciated that, in other embodiments, the surface profile of the first cam profile portion 270 may have any other suitable configuration that allows the louvers 114 to be maintained at a user-selected position within the first angular range 140 (FIG. 3) of louver positions, such as configuring the first cam profile portion 270 to define a flat or planar surface profile between the profile transition points 272, 274.

In contrast, the surface profile of the second and third cam profile portions 278, 280 may be selected such that louver closure assembly 200 functions to automatically linearly actuate the louver tilt assembly 150 when the louvers 114 are rotated into one of the second or third angular ranges 142, 144 (FIG. 3) of louver positions (e.g., one of the automatic louver closure ranges), thereby providing for automatic closure of the louvers 114 to the associated closed position C1, C2 (FIG. 3). For example, as shown in FIGS. 6 and 7, each of the second and third cam profile portions 278, 280 is characterized by a sharply angled ramp surface 228 extending from the adjacent profile transition point 272, 274. As indicated above, each plunger 240, 248 may be configured to be positioned at the first profile transition point 272 when the louvers 114 are located at the first louver transition position B1 (FIG. 3). Accordingly, any further rotation of the louvers 114 toward the first closed position C1 (FIG. 3) will result in each plunger 240, 248 being moved into engagement with the respective ramp surface 288 of the second cam profile portion 278. In such an embodiment, the angle of the ramp surface 288 of each second cam profile portion 278 may be selected such that the biasing force applied against each plunger 240, 248 via its respective biasing spring 246, 254 results in the plunger 240, 248 freely sliding down the ramp surface 288 (i.e., without requiring any user input), which, in turn, results in automatic linear translation of the first and second actuators 202, 204 in opposed directions (e.g., due to the resultant force applied by the plunger 240, 248 against the respective engagement section 258, 262) and, thus, corresponding automatic rotation of the louvers 114 towards their first closed position C1 (FIG. 3).

Similarly, as indicated above, each plunger 240, 248 may be configured to be positioned at the second profile transition point 274 when the louvers 114 are located at the second louver transition position B2 (FIG. 3). Accordingly, any further rotation of the louvers 114 toward the second closed position C2 (FIG. 3) will result in each plunger 240, 248 being moved into engagement with the respective ramp surface 288 of the third cam profile portion 280. In such an embodiment, similar to the ramp surfaces 288 of the second cam profile portions 278, the angle of the ramp surface 288 of each third cam profile portion 280 may be selected such that the biasing force applied against each plunger 240, 248 via its respective biasing spring 246, 254 results in the plunger 240, 248 freely sliding down the ramp surface 288 (i.e., without requiring any user input), which, in turn, results in automatic linear translation of the first and second actuators 202, 204 in opposed directions (e.g., due to the resultant force applied by the plunger 240, 248 against the respective engagement section 258, 262) and, thus, corresponding automatic rotation of the louvers 114 towards their second closed position C2 (FIG. 3).

As shown in FIGS. 6 and 7, in addition to the ramp surfaces 288, each of the second and third cam profile portions 278, 280 may include a flattened section 290 extending from the respective ramp surface 288. In one embodiment, such flattened sections 290 may be provided to accommodate manufacturing and/or assembly tolerances within the shutter panel 104, such as slight misalignments between the relative positioning of the first plunger 240 of the first actuator 202 and the cam profile of the second engagement section 262 of the second actuator 204 and the relative positioning of the second plunger 248 of the second actuator 204 and the cam profile of the first engagement section 258 of the first actuator 202. In addition, the flattened sections 290 may accommodate manufacturing and/or assembly tolerances between different louver closure assemblies installed within a given shutter panel, such as the first and second louver closure assemblies 200A, 200B described above with reference to FIG. 4.

Referring now to FIGS. 5 and 10-13, the operation of the disclosed louver closure assembly 200, as well as the interaction between the louver closure assembly 200 and the associated damper 300 will now be described with reference to rotation of the louvers 114 across their entire angular travel range. As indicated above, FIG. 5 illustrates the relative positioning of the first and second actuators 202, 204 when the louvers 114 are at the fully opened position A (FIG. 3). As shown in FIG. 5, at such louver position, each plunger 240, 248 is located at the center 276 of the first cam profile portion 270 (FIGS. 6 and 7) of its respective engagement section 258, 262. Additionally, at such louver position, the associated damper 300 may be configured to be disengaged from the louver closure assembly 200. For instance, as shown in FIG. 5, the contact end 302 of the damper 300 is spaced apart from the associated damper contact surfaces 230, 232 of the first and second actuators 202, 204 by a given distance 330. Accordingly, with the louvers 114 at the fully opened position A (FIG. 3), the damper 300 does not resist movement of the actuators 202, 204 and, thus, does not function to resist rotation of the louvers 114.

Figure 10:
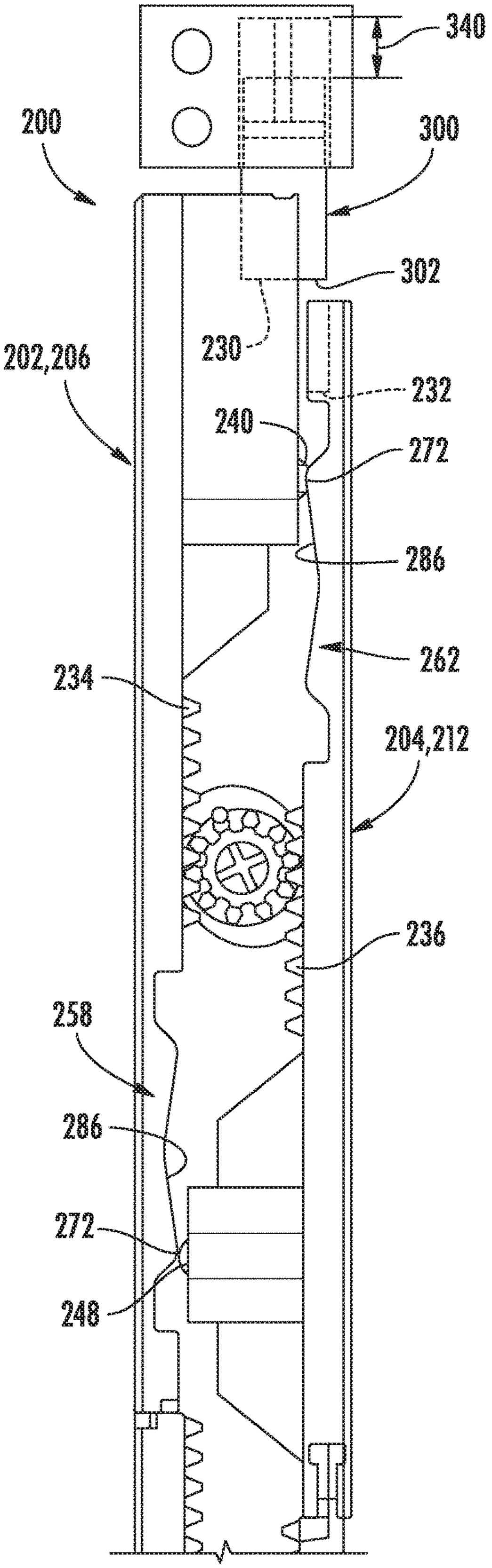
FIG. 10 illustrates a similar side view of the louver closure assembly and related damper shown in FIG. 5 in accordance with aspects of the present subject matter, particularly illustrating the relative positioning of the components of the louver closure assembly and related damper when the louvers of the shutter panel are at a first louver transition position.
Figure 11:
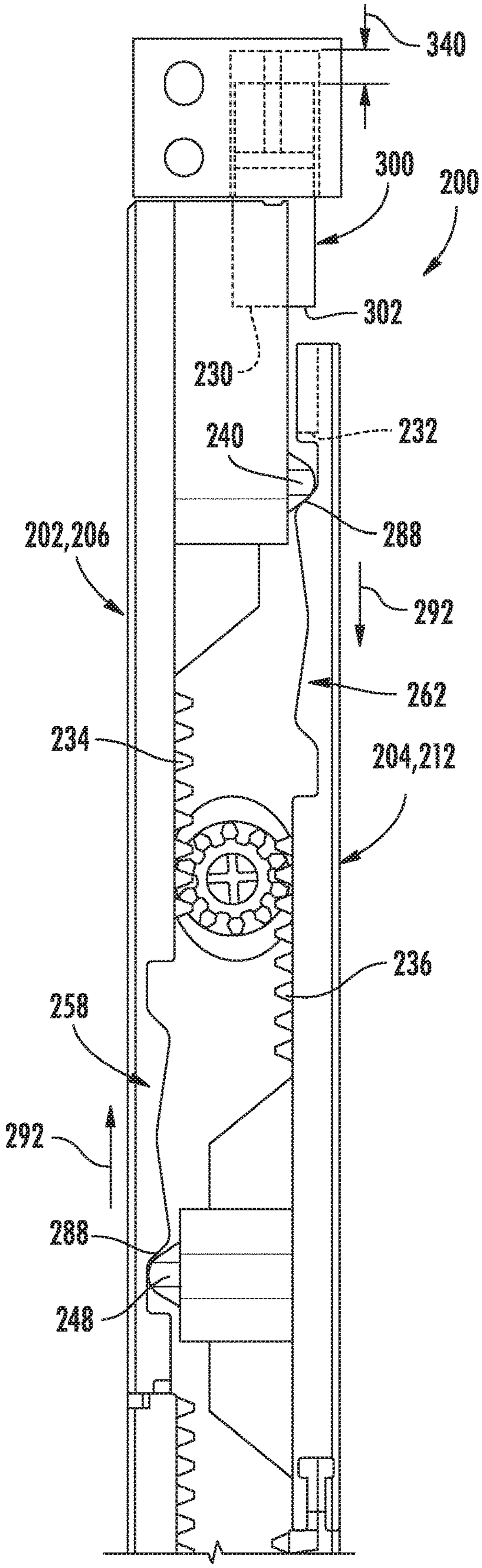
FIG. 11 illustrates a similar side view of the louver closure assembly and related damper shown in FIG. 5 in accordance with aspects of the present subject matter, particularly illustrating the relative positioning of the components of the louver closure assembly and related damper after the louvers of the shutter panel have been rotated from the first louver transition position to a first closed position.

FIGS. 10 and 11 illustrate the relative positioning of the first and second actuators 202, 204 when the louvers 114 are disposed at the first louver transition position B1 (FIG. 3) and the first closed position C1 (FIG. 3), respectively. As indicated above, as the louvers 114 are rotated from their fully opened position A (FIG. 3) in the first tilt direction 130 (FIG. 3), the plungers 240, 248 of each actuator 202, 204 ride along the inclined surfaces 286 of the first cam profile portion (FIGS. 6 and 7) of each engagement section 258, 262 until the louvers 114 reach the first louver transition position B1 (FIG. 3), at which point each plunger 240, 248 will be located at the first profile transition point 272 (e.g., the plunger positions shown in FIG. 10). As shown by the difference in actuator positions between FIG. 5 and FIG. 10, such louver rotation results in relative linear translation between the first and second actuators 202, 204 such that the first actuator 202 moves linearly towards the damper 300 and the second actuator 204 moves away from the damper 300. As particularly shown in FIG. 10, when the louvers 114 reach their first louver transition position B1 (FIG. 3), the first actuator 202 is positioned relative to the damper 300 such that the first damper contact surface 230 is located immediately adjacent to the contact end 302 of the damper 300. Accordingly, any further rotation of the louvers 114 in the first tilt direction 130 (FIG. 3) will result in engagement between the damper 300 and the first actuator 202 (e.g., via contact between the contact end 302 of the damper 300 and the adjacent contact surface 230 of the actuator 202). Thus, when the louvers 114 are further rotated past the first louver transition position B1 (FIG. 3) in the first tilt direction 130 (FIG. 3), the damper 300 may function to slow or resist linear translation of the actuators 202, 204 as the louver closure assembly 200 simultaneously functions to automatically rotate the louvers 114 to the first closed position C1 (FIG. 3), which, in turn, allows for the rotational motion of the louvers 114 to be slowed or damped. Specifically, as indicated above, with rotation of the louvers 114 past the first louver transition position B1 (FIG. 3), each plunger 240, 248 may transition to the ramp surface 288 (FIG. 11) of the second cam profile portion 278 (FIGS. 6 and 7) of its respective engagement section 258, 262, thereby initiating automatic closure of the louvers 114 as the plungers 240, 248 slide down the ramp surfaces 288 (e.g., to the positions shown in FIG. 11). Such sliding of the plungers 240, 248 down the ramp surfaces 288 generates resultant forces (indicated by arrows 292 in FIG. 11) that push the first actuator 202 in the direction of damper 300 and the second actuator 204 away from the damper 300, thereby resulting in the louvers 114 being rotationally driven to their first closed position C1 (FIG. 3). However, during this automatic translation of the actuators 202, 204, the movement of the first actuator 202 into engagement with the damper 300 allows the damper 300 to slow such movement of the actuators 202, 204. Specifically, as the first actuator 202 pushes against the contact end 302 of the damper 300, the damper 300 compresses at a relatively controlled rate to regulate the linear rate of movement of the actuators 202, 204 and, thus, the rotational speed of the louvers 114. The compression of the damper 300 is shown, for example, by the difference in distances 340 shown in FIGS. 10 and 11 (e.g., the distance at which the damper rod extends outwardly from the damper cylinder).

Figure 12:
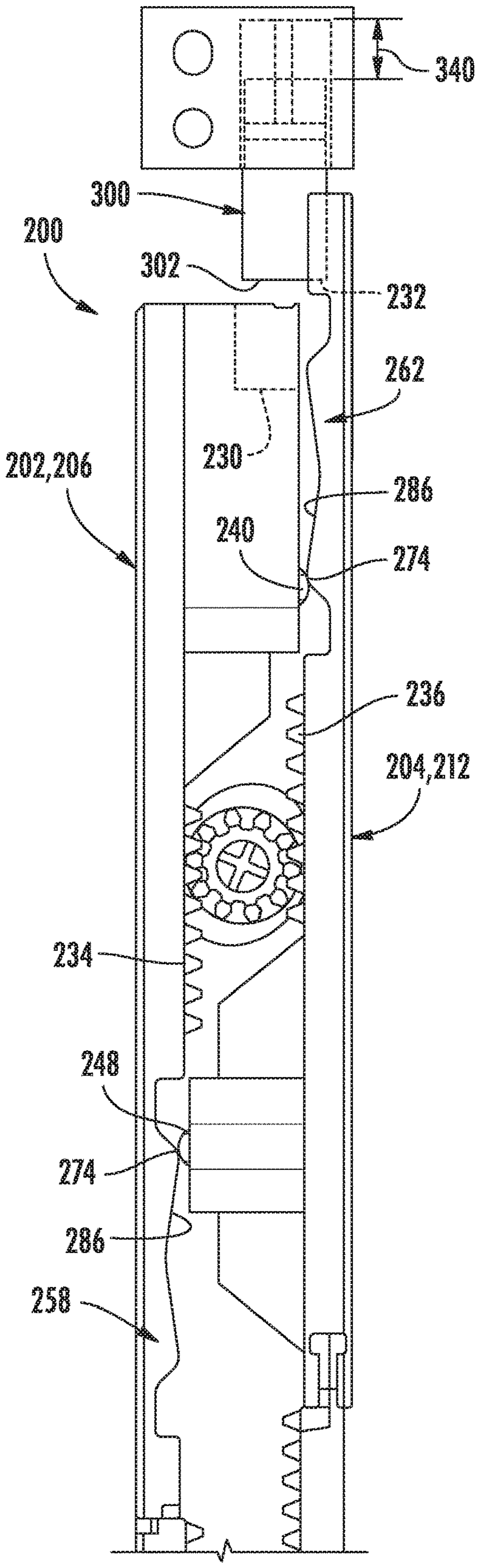
FIG. 12 illustrates a similar side view of the louver closure assembly and related damper shown in FIG. 5 in accordance with aspects of the present subject matter, particularly illustrating the relative positioning of the components of the louver closure assembly and related damper when the louvers of the shutter panel are at a second louver transition position.
Figure 13:
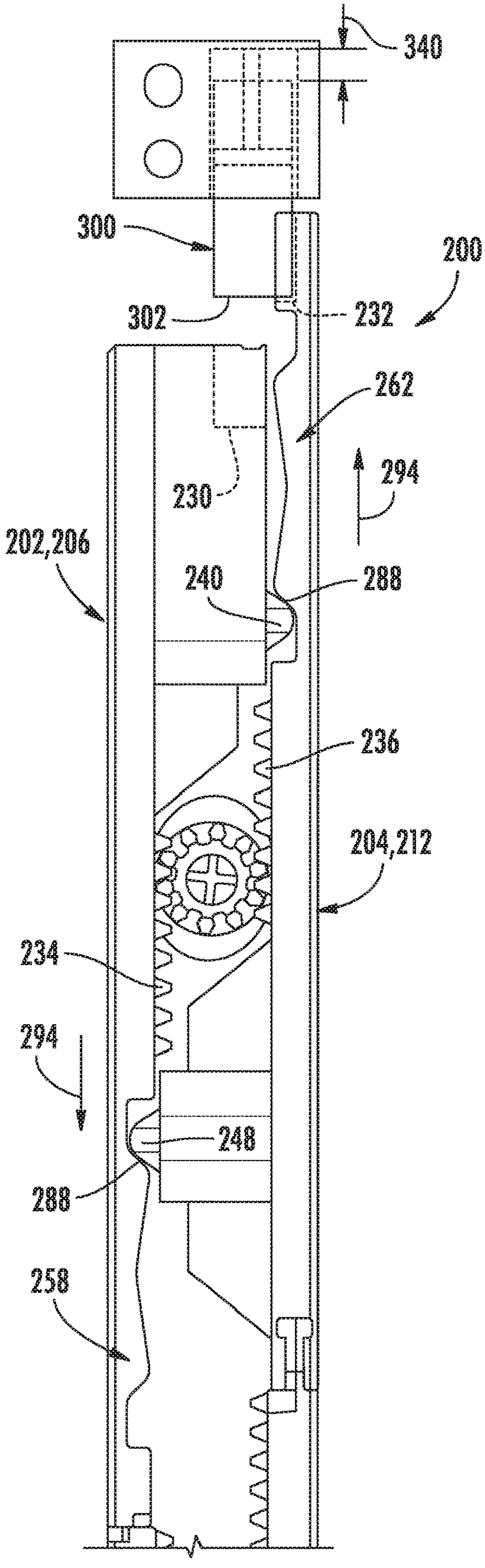
FIG. 13 illustrates a similar side view of the louver closure assembly and related damper shown in FIG. 5 in accordance with aspects of the present subject matter, particularly illustrating the relative positioning of the components of the louver closure assembly and related damper after the louvers of the shutter panel have been rotated from the second louver transition position to a second closed position.

It should be appreciated that the louver closure assembly 200 may operate in a similar manner with rotation of the louvers 114 in the opposite direction. For instance, FIGS. 12 and 13 illustrate the relative positioning of the first and second actuators 202, 204 when the louvers 114 are at the second louver transition position B2 (FIG. 3) and the second closed position C2 (FIG. 3), respectively. As indicated above, as the louvers 114 are rotated from their fully opened position A (FIG. 3) in the second tilt direction 132 (FIG. 3), the plungers 240, 248 of each actuator 202, 204 ride along the inclined surfaces 286 of the first cam profile portion (FIGS. 6 and 7) of each engagement section 258, 262 until the louvers 114 reach the second louver transition position B2 (FIG. 3), at which point each plunger 248, 250 will be located at the second profile transition point 274 (e.g., the plunger positions shown in FIG. 12). As shown by the difference in actuator positions between FIG. 5 and FIG. 12, such louver rotation results in relative linear translation between the first and second actuators 202, 204 such that the second actuator 204 moves linearly towards the damper 300 and the first actuator 202 moves away from the damper 300. As particularly shown in FIG. 12, when the louvers 114 reach their second louver transition position B2 (FIG. 3), the second actuator 204 is positioned relative to the damper 300 such that the second damper contact surface 232 is located immediately adjacent to the contact end 302 of the damper 300. Accordingly, any further rotation of the louvers 114 in the second tilt direction 132 (FIG. 3) will result in engagement between the damper 300 and the second actuator 204 (e.g., via contact between the contact end 302 of the damper 300 and the adjacent contact surface 232 of the actuator 204). Thus, when the louvers 114 are further rotated past the second louver transition position B3 (FIG. 3) in the second tilt direction 132 (FIG. 3), the damper 300 may function to slow or resist linear translation of the actuators 202, 204 as the louver closure assembly 200 simultaneously functions to automatically rotate the louvers 114 to the second closed position C2 (FIG. 3), which, in turn, allows for the rotational motion of the louvers 114 to be slowed or damped. Specifically, as indicated above, with rotation of the louvers 114 past the second louver transition position B2 (FIG. 3), each plunger 240, 248 may transition to the ramp surface 288 (FIG. 13) of the third cam profile portion 280 (FIGS. 6 and 7) of its respective engagement section 258, 262, thereby initiating automatic closure of the louvers 114 as the plungers 240, 248 slide down the ramp surfaces 288 (e.g., to the positions shown in FIG. 13). Such sliding of the plungers 240, 248 down the ramp surfaces 288 generates resultant forces (indicated by arrows 294 in FIG. 13) that push the second actuator 204 in the direction of damper 300 and the first actuator 202 away from the damper 300, thereby resulting in the louvers 114 being rotationally driven to their second closed position C2 (FIG. 3). However, during this automatic translation of the actuators 202, 204, the movement of the second actuator 204 into engagement with the damper 300 allows the damper 300 to slow such movement of the actuators 202, 204. Specifically, as the first actuator 202 pushes against the contact end 302 of the damper 300, the damper 300 compresses at a relatively controlled rate to regulate the linear rate of movement of the actuators 202, 204 and, thus, the rotational speed of the louvers 114. The compression of the damper 300 is shown, for example, by the difference in distances 340 shown in FIGS. 12 and 13 (e.g., the distance at which the damper rod extends outwardly from the damper cylinder).

Figure 14:
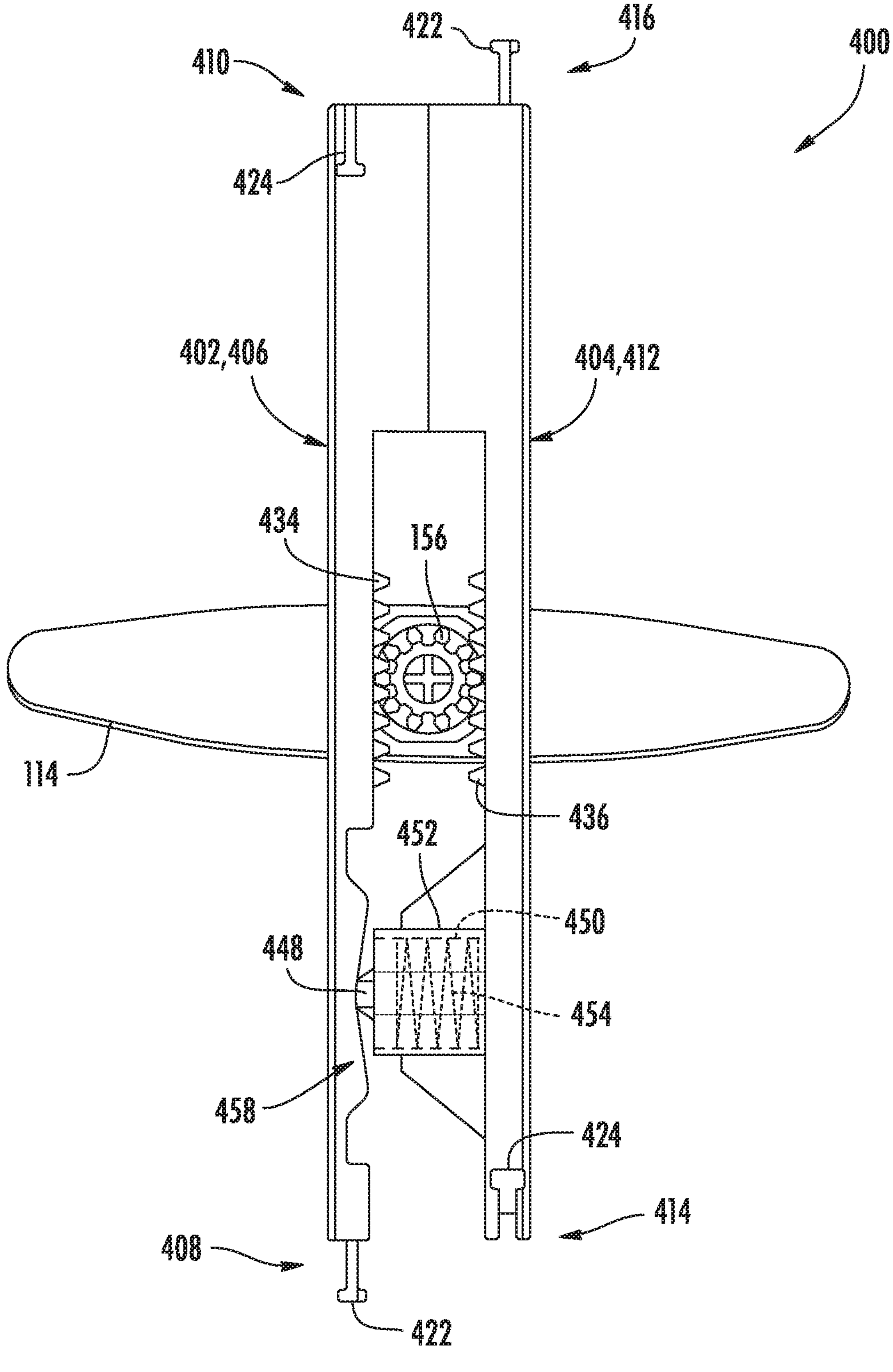
FIG. 14 illustrates a side view of another illustrative embodiment of a louver closure assembly as installed relative to adjacent components of a shutter panel in accordance with aspects of the present subject matter, particularly illustrating the relative positioning of the components of the louver closure assembly when the louvers of the shutter panel are at the fully opened position.
Figure 15:
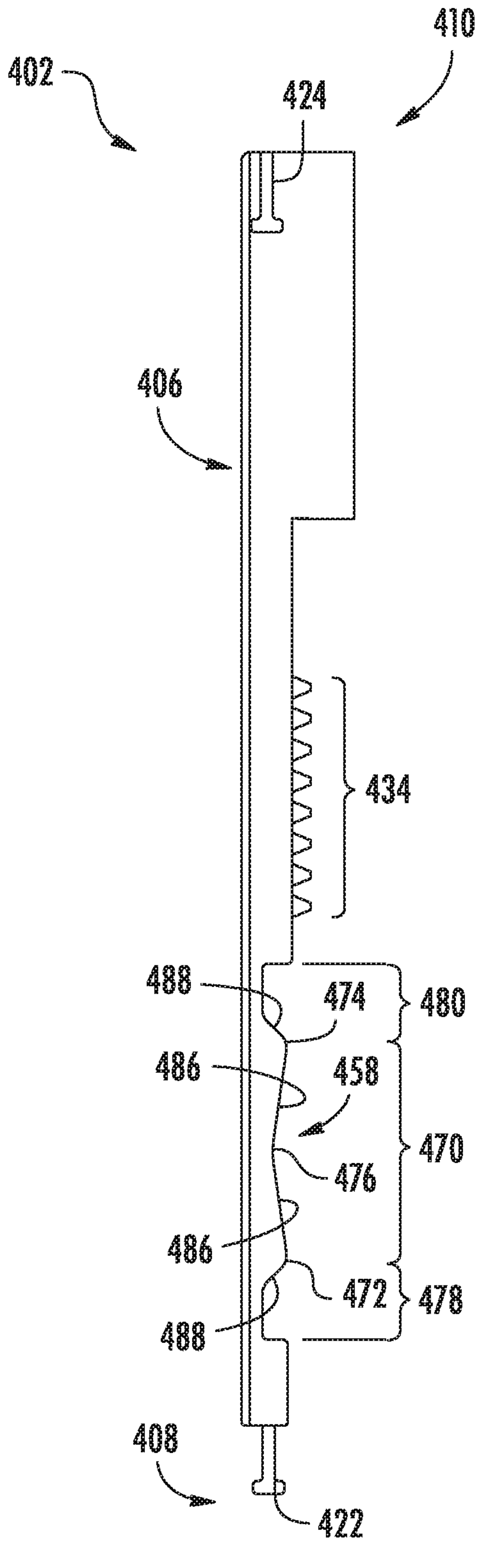
FIG. 15 illustrates a side view of a first actuator component of the louver closure assembly shown in FIG. 14 in accordance with aspects of the present subject matter.
Figure 16:
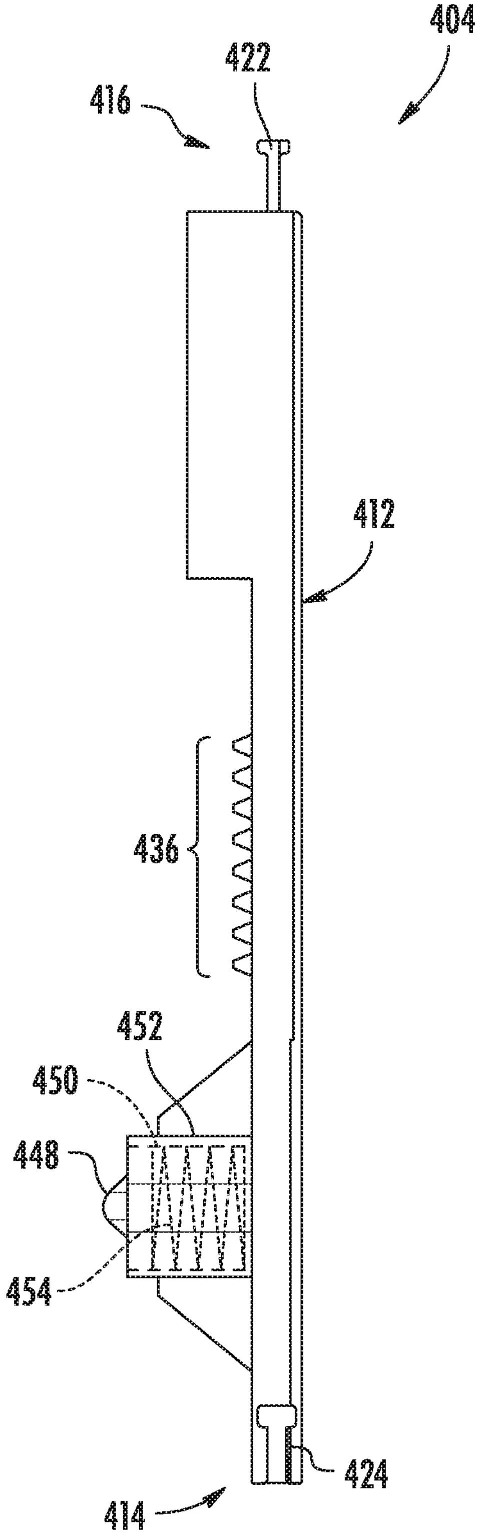
FIG. 16 illustrates a side view of a second actuator component of the louver closure assembly shown in FIG. 14 in accordance with aspects of the present subject matter.

Referring now to FIGS. 14-16, exemplary views of another illustrative embodiment of a louver closure assembly 400 are illustrated in accordance with aspects of the present subject matter, with FIG. 14 illustrating the louver closure assembly 400 assembled relative to an adjacent louver 114 and associated louver tilt gear 156 of a shutter panel and FIGS. 15 and 16 illustrating side views of separate actuators of the louver closure assembly 400. In general, the louver closure assembly shown 400 in FIGS. 14-16 may be configured similarly to the louver closure assembly 200 described above with reference to FIGS. 5-9. As such, the components or features of the louver closure assembly 400 that are the same or similar to corresponding components or features of the louver closure assembly 200 described above with reference to FIGS. 5-9 will be designated by the same reference character separated by a value of two-hundred (200). Additionally, when a given component or feature of the louver closure assembly 400 is configured to generally perform the same function as the corresponding component or feature of the louver closure assembly 200 described above with reference to FIGS. 5-9, a less detailed description of such component/feature will be provided with reference to FIGS. 14-16 for the sake of brevity.

As shown in FIG. 14, the louver closure assembly 400 includes first and second actuators 402, 404 configured to be assembled side-by-side (e.g., within the interior of a shutter frame 112 (FIG. 4)) relative to an associated louver 114, with each actuator including 402, 404 including an actuator bar 406, 412 extending lengthwise between opposed ends of the actuator 402, 404. Specifically, the first actuator 402 includes a first actuator bar 406 extending lengthwise between a first end 408 and an opposed second end 410 of the actuator 402, while the second actuator 404 includes a second actuator bar 412 extending lengthwise between a first end 414 and an opposed second end 416 of the actuator 404. Additionally, similar to the actuators 202, 204 described above with reference to FIGS. 5-9, each actuator 402, 404 includes a gear rack section 434, 436 including a plurality of gear teeth configured to mesh with the associated louver tilt gear 156 of the adjacent louver 114. As such, the geared engagement between the rack sections 434, 436 and the louver tilt gear 156 allows linear translation of the actuators 402, 404 to be converted into rotational motion of the louver 114 and vice versa.

However, unlike the embodiment of the louver closure assembly 200 described above with reference to FIGS. 5-9 in which each actuator 202, 204 includes both an interface end for coupling the actuator to the louver tilt assembly 150 (FIG. 4) and a damper end configured to contact the adjacent damper 300 (FIG. 4), both ends of each actuator 402, 404 of the louver closure assembly 400 shown in FIGS. 14-16 correspond to interface ends or connection ends configured to be coupled to an adjacent component of the louver tilt assembly 150 (FIG. 4). As such, the louver closure assembly 400 may, for example, be configured to be coupled between adjacent rack segments 152A, 154A (FIG. 4) of the gear racks 152, 154 of the louver tilt assembly 150 as opposed to at one of the ends of the gear racks 152, 154. Such a configuration may allow the louver closure assembly 400 to be installed at any suitable location between the opposed ends of the gear racks 152, 154. Moreover, as will be described below with reference to FIGS. 17 and 18, the ability to install the louver closure assembly 400 between adjacent rack segments 152A, 154A of the gear racks 152, 154 allows the shutter panel components to be designed as a modular system, with the rack segments 152A, 154A and louver closure assembly 400 being configured as interchangeable, modular components that can be installed in place of each other within the panel, as desired or required. For instance, in one embodiment, it may be desirable to install the louver closure assembly 400 as a supplemental or auxiliary louver closure assembly between the opposed ends of the louver tilt assembly 150 to provide an additional source of louver closing forces for when the louvers 114 are being rotated to one of their closed positions C1, C2 (FIG. 3).

It should be appreciated that the opposed ends of each actuator 402, 404 may be configured to be coupled between adjacent rack segments 152A, 154A of each gear rack 152, 154 using any suitable mechanical coupling or connection means that allows such components to translate together within the shutter frame. However, as indicated above, it may be desirable to provide a common interface arrangement between the various components of the shutter panel to allow for ease of assembly, as well interchangeability when using a modular system. Thus, in several embodiments, the ends of the actuator 402, 404 may be configured for coupling to the adjacent rack segments 152A, 154A via the same or a similar male/female connection arrangement as that described above with reference to FIGS. 5-9. Specifically, as shown in FIGS. 14 and 15, the first actuator bar 406 includes both a shaped projection 422 at its first end 408 (e.g., a T-shaped projection) that is configured to be received within a correspondingly shaped recess 224 (FIG. 5) (e.g., a T-shaped recess) formed within one of the adjacent rack segments 152A of the first gear rack 152 and a shaped recess 424 defined at its opposed end 410 (e.g., a T-shaped recess) that is configured to receive a correspondingly shaped projection 222 (FIG. 5) (e.g., a T-shaped projection) extending from the other adjacent rack segment 152A of the first gear rack 152. Similarly, as shown in FIGS. 14 and 16, the second actuator bar 412 includes both a shaped recess 424 defined at its first end 414 (e.g., a T-shaped recess) that is configured to receive a correspondingly shaped projection 222 (FIG. 5) (e.g., a T-shaped projection) extending from one of the adjacent rack segment 154A of the second gear rack 154 and a shaped projection 422 at its opposed second end 416 (e.g., a T-shaped projection) that is configured to be received within a correspondingly shaped recess 224 (FIG. 5) (e.g., a T-shaped recess) formed within the other adjacent rack segment 154A of the second gear rack 154. It should be appreciated that, in other embodiments, the ends of the actuator bars 406, 412 may be configured to be coupled between the adjacent rack segments 152A, 154A of the gear racks 152, 154 in any other manner, such as by using a different male/female connection arrangement and/or by using suitable mechanical fasteners, adhesives, and/or the like.

Additionally, it should be appreciated that, as an alternative to the illustrated embodiment, the louver closure assembly 400 may, instead, be configured to be coupled to one of the ends of the louver tilt assembly 150 in a manner similar to the louver closure assembly 200 described above with reference to FIGS. 5-9. In such an embodiment, each actuator 402, 404 may, for example, include features for interfacing or engaging an associated damper. For instance, the second end 410, 416 of each actuator bar 406, 412 may, instead, correspond to a damper end of the respective actuator 402, 404 that is configured to selectively engage an adjacent damper 300 (FIG. 5) of the shutter panel 104 when the louver closure assembly 400 is functioning to automatically close the louvers 114.

Additionally, similar to the louver closure assembly 200 described above with reference to FIGS. 5-9, each actuator 402, 404 may include one or more auto-closure features that allow the louver closure assembly 400 to facilitate automatic closure of the louvers 114. However, unlike the dual-actuation arrangement described above in which each actuator includes a follower member (e.g., plunger) configured to engage a corresponding engagement section of the opposed actuator, the louver closure assembly 400 shown in the illustrated embodiment of FIGS. 14-16 is configured as a single-actuation arrangement and, thus, only includes a single follower member and associated engagement section. Specifically, as shown in the exemplary embodiment, the second actuator 404 includes a spring-biased plunger 448 generally configured the same as the second spring-biased plunger 228 described above. For instance, the plunger 448 is configured to be installed within a plunger opening 450 defined by a plunger housing 452 coupled to or formed integrally with the second actuator bar 412, with a biasing member (e.g., spring 454) being compressed between the plunger 448 and the second actuator bar 412 such that the biasing member biases the plunger 448 outwardly away from the actuator bar 412 (and towards the opposed first actuator 402). Additionally, as shown in the illustrated embodiment, the first actuator 402 includes an engagement section 458 configured the same as the first engagement section 258 described above. For instance, as particularly shown in FIG. 15, the engagement section 458 includes three separate cam profile portions (e.g., a first cam profile portion 470, a second cam profile portion 478, and a third cam profile portion 480), with each cam profile portion 470, 478, 480 being associated with a corresponding angular range of louver positions for the louvers 114.

In the illustrated embodiment, the interaction between the plunger 448 and the engagement section 458 may generally be the same as the interaction described above with reference to FIGS. 5 and 10-13. For example, as the louvers 114 are rotated across their first angular travel range 140 (FIG. 3), the plunger 448 may be configured to ride across the inclined surfaces 486 (FIG. 15) of the first cam profile portion 470 extending between the profile center 476 (FIG. 15) and the opposed first and second profile transition points 472, 474 (FIG. 15). However, as the louvers 114 are rotated from a position within their first angular travel range 140 (FIG. 3) to a position within their second angular travel range 142 (FIG. 3), the plunger 448 may freely slide down the ramp surface 488 (FIG. 15) of the second cam profile portion 478 (i.e., without requiring any user input), which, in turn, results in automatic linear translation of the first and second actuators 402, 404 in opposed directions (e.g., due to the resultant force applied by the plunger 448 against the engagement section 458) and, thus, corresponding automatic rotation of the louvers 114 towards their first closed position C1 (FIG. 3). Similarly, as the louvers 114 are rotated from a position within their first angular travel range 140 (FIG. 3) to a position within their third angular travel range 142 (FIG. 3), the plunger 448 may freely slide down the ramp surface 488 (FIG. 15) of the third cam profile portion 478 (i.e., without requiring any user input), which, in turn, results in automatic linear translation of the first and second actuators 402, 404 in opposed directions (e.g., due to the resultant force applied by the plunger 448 against the engagement section 458) and, thus, corresponding automatic rotation of the louvers 114 towards their second closed position C2 (FIG. 3).

It should be appreciated that, in an alternative embodiment, the automatic closure features of the single-actuation arrangement shown in FIGS. 14-16 may be reversed, with the first actuator 402 being configured to include a follower member (e.g., a spring-biased plunger) configured to engage a corresponding engagement section of the second actuator 404. Additionally, it should be appreciated that, in other embodiments, the louver closure assembly 400 may, instead, have a dual-actuation arrangement similar to the louver closure assembly 200 described above with reference to FIGS. 5-9. In such embodiments, in addition to the automatic closure features shown in FIGS. 14-16, the first actuator 402 may also include a follower member (e.g., a spring-biased plunger) configured to engage a corresponding engagement section of the second actuator 404.

Figure 17:
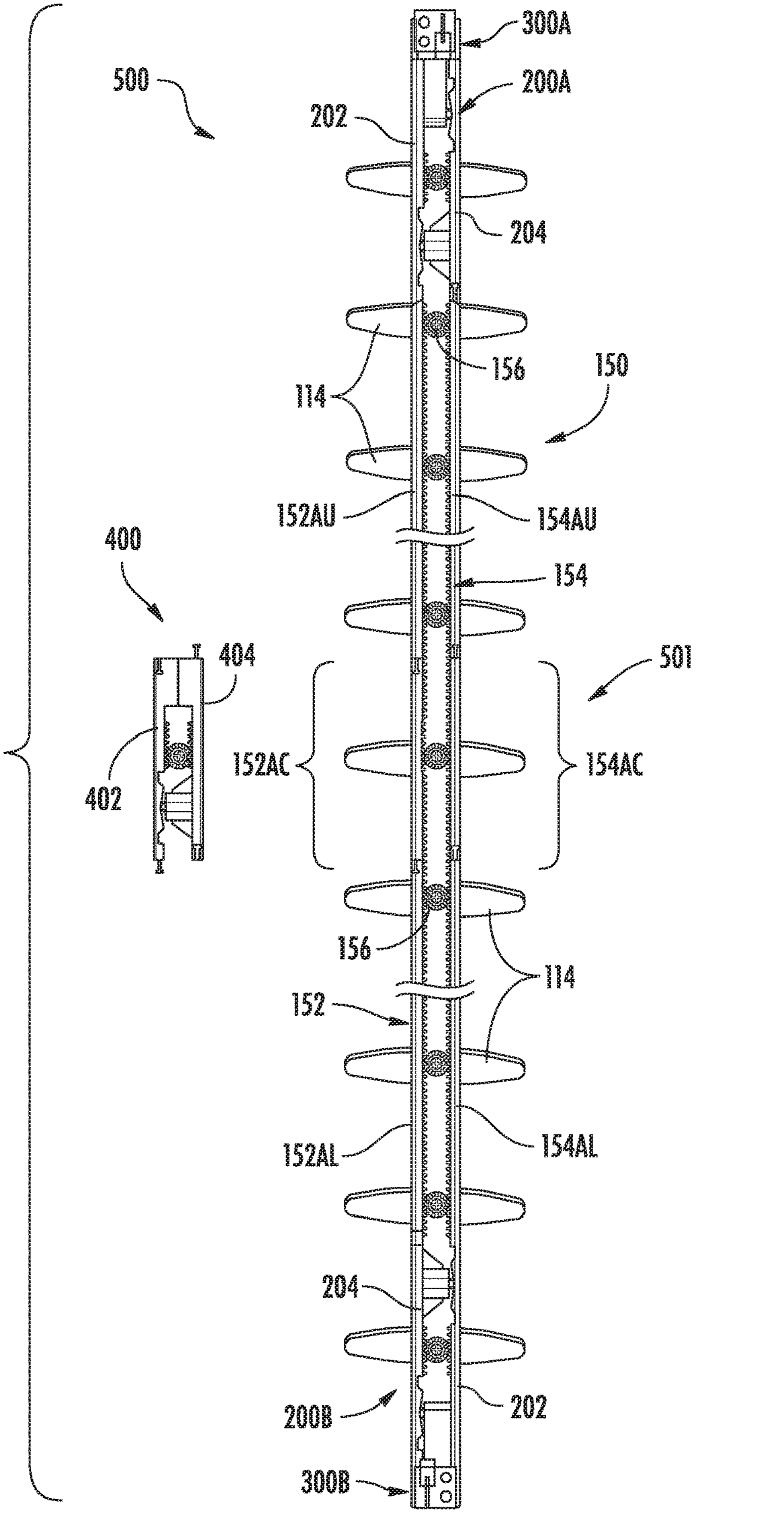
FIG. 17 illustrates an exemplary partial, side view of one illustrative embodiment of a modular louver tilt and closure system in accordance with aspects of the present subject matter, particularly illustrating a modular louver closure assembly configured for installation within a louver tilt assembly of the system.
Figure 18:
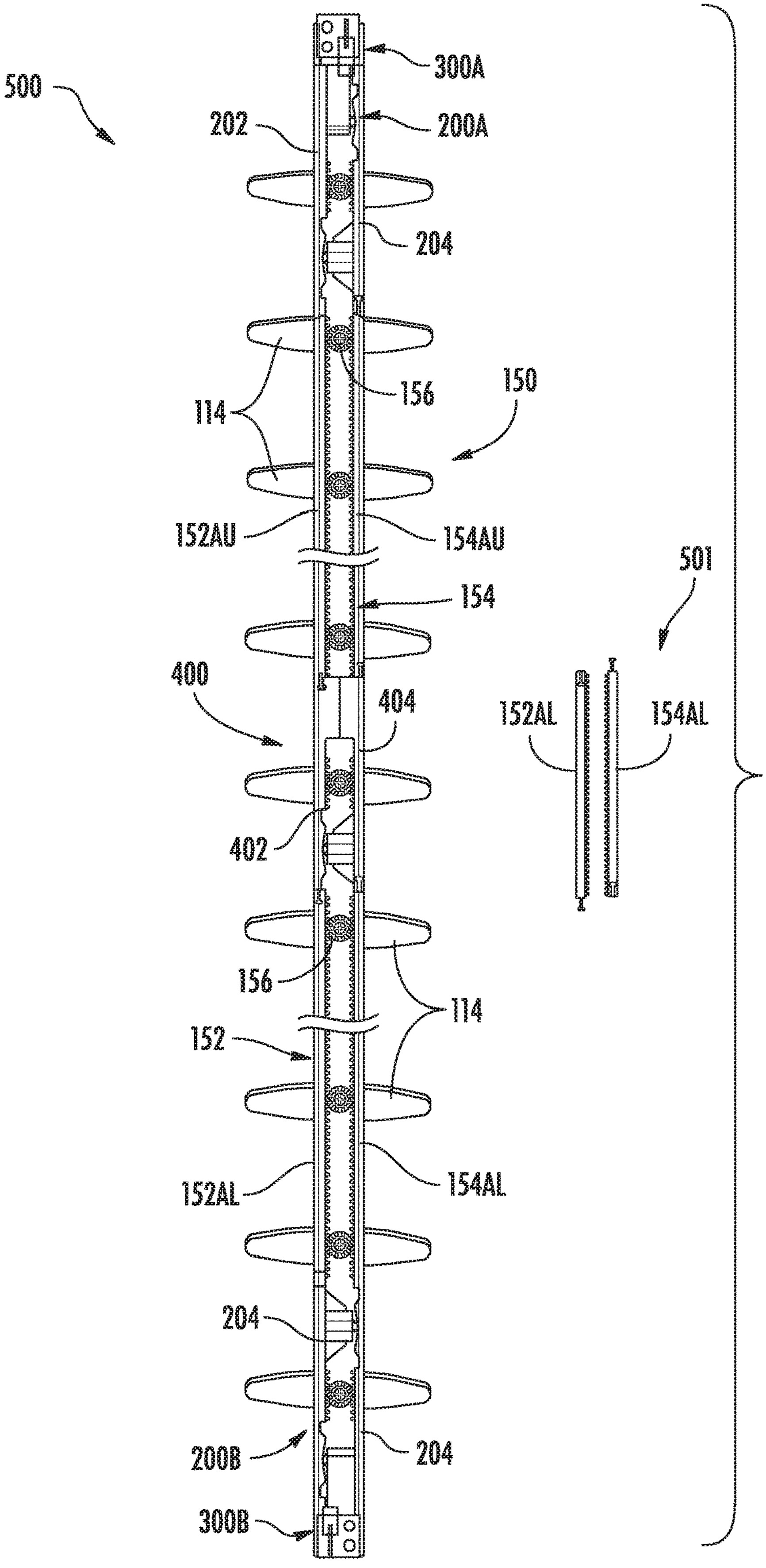
FIG. 18 illustrates another exemplary partial, side view of the modular louver tilt and closure system shown in FIG. 17, particularly illustrating the modular louver closure assembly installed within the louver tilt assembly in the place of corresponding rack segments of the louver tilt assembly.

Referring now to FIGS. 17 and 18, exemplary partial, side views of one illustrative embodiment of a modular louver tilt and closure system 500 are illustrated in accordance with aspects of the present subject matter. Specifically, in the illustrated embodiment, the system 500 includes many of the various shutter components described above. For example, the system 500 includes the louver tilt assembly 150, the first and second closure assemblies 200A, 200B, and the associated dampers 300A, 300B described above with reference to FIG. 4.

As described above, each gear rack 152, 154 of the louver tilt assembly 150 may be formed from a plurality of rack segments 152A, 154A coupled end-to-end along the length of the rack 152, 154 (e.g., via the common male/female interface arrangement). For instance, in the illustrated embodiment, each gear rack 152, 154 is formed from three rack segments 152A, 154A. Specifically, as shown in FIG. 17, the first gear rack 152 includes an upper rack segment 152AU configured to be coupled at its top end to the first actuator 202 of the first louver closure assembly 200A, a lower rack segment 152AL configured to be coupled at its bottom end to the second actuator 204 of the second louver closure assembly 200B, and a central rack segment 152AC coupled end-to-end between the upper and lower rack segments 152AU, 152AL. Similarly, as shown in FIG. 17, the second gear rack 154 includes an upper rack segment 154AU configured to be coupled at its top end to the second actuator 204 of the first louver closure assembly 200A, a lower rack segment 154AL configured to be coupled at its bottom end to the first actuator 202 of the second louver closure assembly 200B, and a central rack segment 154AC coupled end-to-end between the upper and lower rack segments 154AU, 154AL. However, it should be appreciated that, in other embodiments, each gear rack 152, 154 may be formed from any other suitable number of gear rack segments 152A, 154A, such as four or more gear rack segments 152A, 154A.

In several embodiments, one or more of the gear rack segments 152A, 154A may be configured as a modular rack section 501 that is interchangeable with a corresponding modular louver closure assembly, such as the louver closure assembly 400 described above with reference to FIGS. 14-16. For instance, in the illustrated embodiment, the central gear rack segments 152AC, 154AC are configured to be replaced, when desired or necessary, with the modular louver closure assembly 400 shown in FIGS. 17 and 18. Thus, when the associated shutter panel is relatively large (e.g., by having a relatively large height/width) and/or in any other scenario in which an additional or supplemental louver closing force is desired, the modular rack section 501 formed by the central gear rack segments 152AC, 154AC may be removed and replaced with the modular louver closure assembly 400 (e.g., as shown in FIG. 18). In such an embodiment, the common interface arrangement provided between the rack segments 152A, 154A and the louver closure assembly 400 (e.g., the male/female interface components, such as the T-shaped projections/recesses described above) allows the louver closure assembly 400 to be quickly and easily installed between the upper and lower rack segments of each gear rack 152, 154.

It should be appreciated that, although the embodiment of the system 500 shown in FIGS. 17 and 18 only includes provisions for a single modular louver closure assembly 400, the system 500 may, instead, include be configured to accommodate any number of modular louver closure assemblies 400, such as by including a corresponding number of replaceable modular rack sections 501. It should also be appreciated that the disclosed modular system 500 may, in certain embodiments, allow a shutter panel to be manufactured and/or assembled with only one of the louver closure assemblies 200A, 200B configured to be installed at the ends of the louver tilt assembly 150. In such embodiments, if it is determined that the single louver closure assembly 200A, 200B does not provide a sufficient or desired amount of closing force to automatically actuate the louvers 114 to their closed position, one or more of the modular louver closure assemblies 400 may be installed within the shutter panel to provide an additional or supplementary closing force within the system 500.

Figure 19:
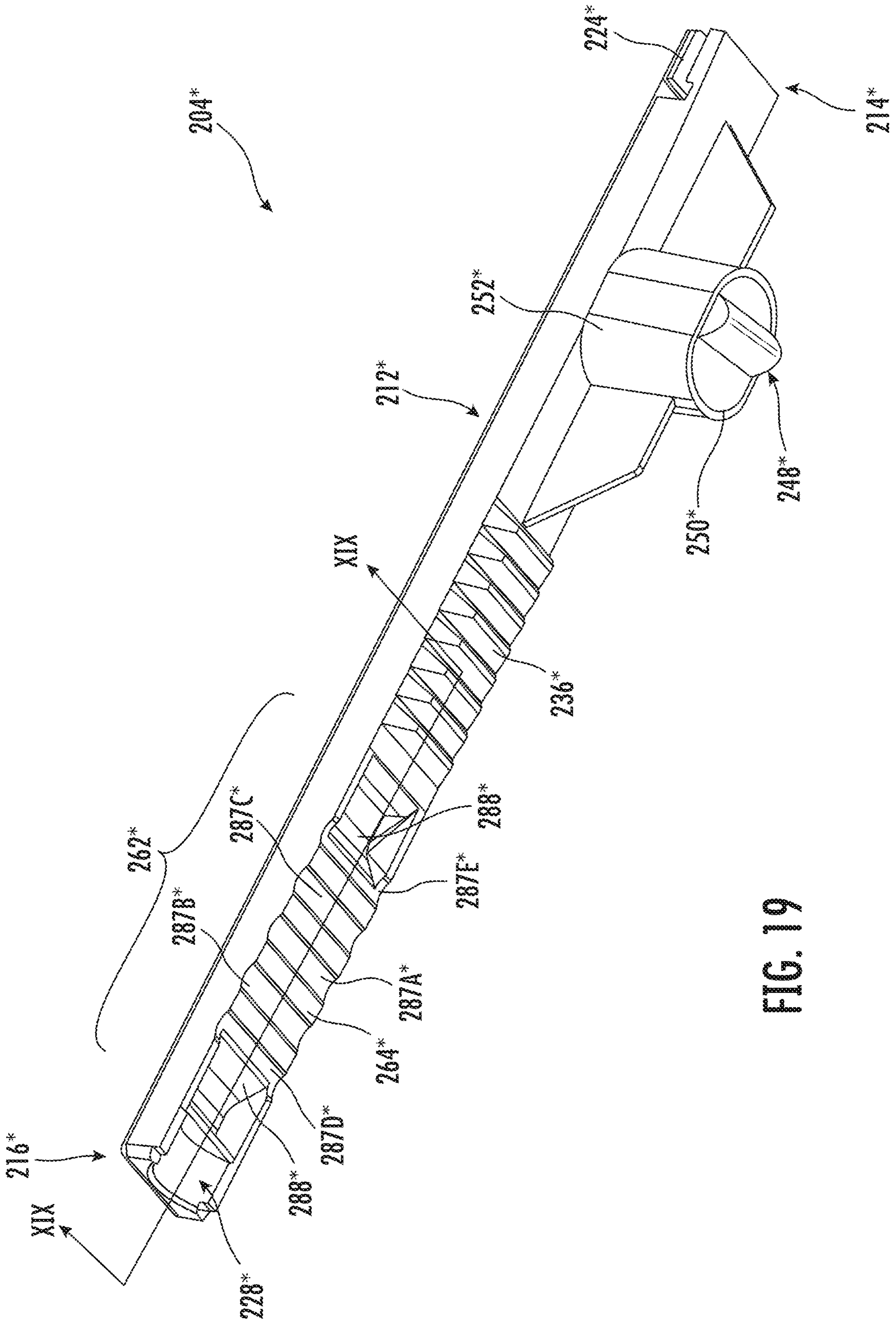
FIG. 19 illustrates a perspective view of one embodiment of an actuator configured for use within one or more of the embodiments of a louver closure assembly in accordance with aspects of the present subject matter.
Figure 20:
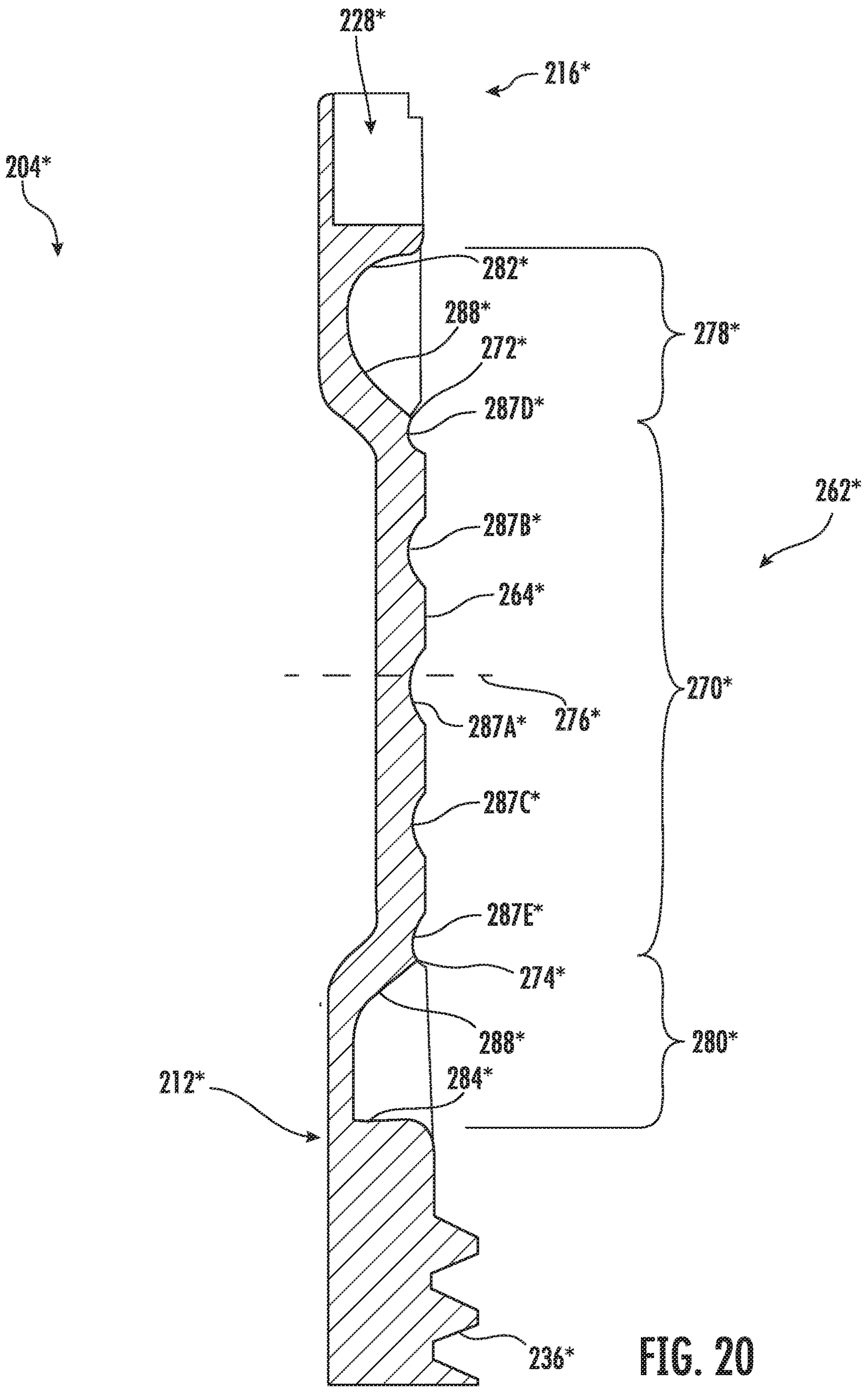
FIG. 20 illustrates a cross-sectional view of the actuator shown in FIG. 19 taken about line XIX-XIX.

Referring now to FIGS. 19 and 20, different views of another embodiment of an actuator 204* configured for use within one or more embodiments of the louver closure assemblies 200, 400 described herein are illustrated in accordance with aspects of the present subject matter. Specifically, FIG. 19 illustrates a perspective view of the actuator 204* and FIG. 20 illustrates a cross-sectional view of the actuator 204* shown in FIG. 19 taken about line XIX-XIX.

In general, the actuator 204* is illustrated to show an alternative embodiment of the second actuator 204 of the louver closure assembly 200 described above with reference to FIGS. 5-13, particularly providing an alternative configuration for the engagement section of the second actuator 204. In this regard, it should be appreciated that, when the engagement section of the second actuator 204 is configured as shown in FIGS. 19 and 20, the first actuator 202 of the louver closure assembly 200 may also include a similarly configured engagement section. It should also be appreciated that, since the actuator 204* shown in FIGS. 19 and 20 is configured similar to the second actuator 204 described above with reference to FIGS. 5-13, the components, features, and/or structures of the actuator 204* that are the same or similar to corresponding components, features, and/or structures of the second actuator 204 described above will be designated by the same reference character with an asterisk (*) added. Additionally, when a given component, feature, and/or structure of the actuator 204* is configured to generally perform the same function as the corresponding component, feature, and/or structure of the second actuator 204 described above, a less detailed description of such component/feature/structure will be provided below for the sake of brevity.

As shown in FIGS. 19 and 20, similar to the second actuator 204 described above, the actuator 204* includes an actuator bar 212* extending lengthwise between a first end 214* and an opposed second end 216* of the actuator 204*. In the illustrated embodiment, the first end 214* of the actuator bar 212* is configured as an interface end or connection end of the actuator 204* that is configured to be coupled to an adjacent component of the associated louver tilt assembly 150 (FIG. 4), such as an adjacent rack segment of the gear rack of the louver tilt assembly 150 (e.g., the second gear rack 154) to allow the actuator 204* to translate within the frame 112 with movement of such gear rack 154. Specifically, as shown in FIG. 19, the actuator bar 212* includes a shaped recess 224* defined at its first end 214* (e.g., a T-shaped recess) that is configured to receive a correspondingly shaped projection 222 (FIG. 5) (e.g., a T-shaped projection) extending from the adjacent rack segment 154A of the second gear rack 154. Additionally, in the illustrated embodiment, the second end 216* of the actuator bar 212* is configured as damper end of the actuator 204* that is configured to selectively engage the adjacent damper 300 (FIG. 5) of the shutter panel 104 when the associated louver closure assembly 200 is functioning to automatically close the louvers 114. Specifically, as shown in FIG. 19, the actuator bar 212* defines a damper channel 228* at its second end 216* that is configured to receive at least a portion of the damper 300 depending on the relative positioning between the damper 300 and the actuator 204*. Moreover, as shown in FIG. 19, the actuator 204* includes a rack section 236* coupled to or formed integrally with the second actuator bar 212* at a location between the first and second ends 214*, 216* of the bar 212* for engaging the associated louver tilt gear 156 (FIG. 5).

Additionally, the actuator 204* includes both a follower member (e.g., a spring-biased plunger 248* positioned within a plunger opening 250* defined by a plunger housing 252* of the actuator 204*) configured to be biased into engagement with a corresponding engagement section of the opposed actuator of the louver closure assembly 200 (e.g., the engagement section 258 (FIG. 8) of the first actuator 202) and an engagement section 262* configured for engagement with a corresponding follower member of the opposed actuator (e.g., the plunger 240 (FIG. 8) of the first actuator 202). Similar to the second actuator 204 described above, the engagement section 262* of the actuator 204* may include an engagement or cam surface 264* defining a cam profile across which the corresponding follower member of the opposed actuator rides as the actuators linearly translate relative to each other with rotation of the louvers 114. Specifically, as shown in FIG. 20, the engagement section 262* includes a first cam profile portion 270* across which the opposed follower member is configured to ride as the louvers 114 are rotated across their first angular travel range 140 (FIG. 3) and second and third cam profile portions 278*, 280* across which the opposed follower member is configured to ride as the louvers 114 are rotated across their second and third angular travel ranges 142, 144 (FIG. 3), respectively.

As shown in FIG. 20, the first cam profile portion 270* extends lengthwise across the engagement section 262* between first and second profile transition points 272*, 274*, with a center 276* of the first cam profile portion 270* being defined equidistant from the opposed transition points 272*, 274*. In such an embodiment, the follower member of the opposed actuator may be configured to be positioned at the center 276* of the adjacent first cam profile portion 270* when the louvers 114 are located at their fully opened position A (FIG. 3). As the louvers 114 are rotated from their fully opened position A in the first tilt direction 130 (FIG. 3), the associated follower member may ride across the adjacent first cam profile portion 270* from its center 276* towards the first profile transition point 272* until the louvers 114 reach their corresponding first louver transition position B1 (FIG. 3), at which point the follower member is configured to be located at the first profile transition point 272* of the engagement section 262*. With further rotation of the louvers 114 in the first tilt direction 130, the follower member will ride down an angled ramp surface 288* defined across the second cam profile portion 278* between the first profile transition point 272* and an opposed end 282* of second cam profile portion 278* as the louvers 114 are actuated to their first closed position C1 (FIG. 3). Similarly, as the louvers 114 are rotated from their fully opened position A in the second tilt direction 132 (FIG. 3), the opposed follower member may ride across the adjacent first cam profile portion 270* from its center 276* towards the second profile transition point 274* until the louvers 114 reach their corresponding second louver transition position B2 (FIG. 3), at which point the follower member is configured to be located at the second profile transition point 274* of the engagement section 262*. With further rotation of the louvers 114 in the second tilt direction 132, the follower member will ride down an angled ramp surface 288* defined across the third cam profile portion 280* between the second profile transition point 274* and an opposed end 284* of third cam profile portion 280* as the louvers 114 are actuated to their second closed position C2 (FIG. 3).

As shown in FIGS. 19 and 20, unlike the inwardly sloped or tapered surface profile of the first cam profile portion 270 described above with reference to FIGS. 5-13, the first cam profile portion 270* of the engagement section 262* is characterized by a generally flat or planar surface profile having a plurality of detents 287* formed therein, with each detent 287* providing a recessed engagement feature within which the opposed follower member is configured to be received when the louvers 114 are rotated to a corresponding louver position defined within the first angular travel range 140 (FIG. 3). Specifically, when the opposed follower member is received with one of the detents 287*, the additional friction between the engagement surface 264* of the first cam profile portion 270* and the follower member at the location of the detent 287* provides an increased holding force for maintaining the follower member at such location. As a result, the various detents 287* may facilitate maintaining the louvers 114 at a corresponding number of respective louver position settings defined across the first angular travel range 140.

It should be appreciated that the specific number of detents 287* provided on the first cam profile portion 270*, along with the relative positioning and spacing of the detents 287* across the first cam profile position 270*, may generally vary depending on the desired number of pre-defined louver position settings as well as the associated angular position and spacing of such louver position settings. As an example, in the illustrated embodiment, the actuator 204* includes five detents 287* spaced apart across the engagement surface 264* of the first cam profile position 270*, namely a central detent 287A*, first and second intermediate detents 287B*, 287C*, and first and second outer detents 287D*, 287E*. In such an embodiment, the central detent 287A* may be positioned at a centralized location along the first cam profile portion 270* (e.g., at or adjacent to the center 276*) such that the opposed follower member is received within the central detent 287A* when the louvers 114 are rotated to a more centralized louver position defined within the first angular travel range 140 (e.g., at the fully opened position A (FIG. 3)). Additionally, the first and second outer detents 287D*, 287E* may be positioned at or adjacent to the ends or outer extents of the first cam profile portion 270* (e.g., at or adjacent to the profile transition points 272*, 274*) so that the opposed follower member is received within one of such detents 287D*, 287E* when the louvers 114 are rotated to the ends or outer extents of the first angular travel range 140. For instance, the relative positioning of the outer detents 287D*, 287E* may correspond to louver positions at or adjacent to the louver transition positions B1, B2 (FIG. 3) such that the follower member is received within one of the outer detents 287D*, 287E* immediately before the louvers 114 are transitioned into the adjacent automatic louver closure range (e.g., the first or second angular travel range 142, 144 (FIG. 3). As such, the outer detents 287D*, 287E* may facilitate positioning and maintaining the louvers 114 at the outer extents of the first angular travel range 140, which may, for example, assist in preventing unintentional movement of the louvers 114 into the adjacent automatic louver closure range due to the increased friction provided at such detent locations. Moreover, as shown in FIG. 20, the intermediate detents 287B*, 287C* are positioned at "intermediate" locations along the first cam profile portion 270* so that the opposed follower member is received within one of such detents 287B*, 287C* when the louvers 114 are rotated to corresponding "intermediate" louver positions defined across the first angular travel range 140. For instance, the relative positioning of the first intermediate detent 287B* may correspond to a louver position defined between the fully opened position A (FIG. 3) and the first louver transition position B1 (FIG. 3), while the relative positioning of the second intermediate detent 287C* may correspond to a louver position defined between the fully opened position A and the second louver transition position B2 (FIG. 3).

In several embodiments, the positioning of the various detents 287* across the first cam profile position 270* of the actuator 204* may be defined relative to or as function of one or more of the louver positions included within the non-automatic closure or first angular range 140 of louver positions (see FIG. 3), such as the central position of such angular range 140 (e.g., the fully opened position A (FIG. 3)) and/or the endpoints of such angular range 140 (e.g., the first and second louver transition positions B1, B2 (FIG. 3)). For example, in one embodiment, the position of the central detent 287A* may be selected such that the opposed follower member is received within the central detent 287A* when the louvers 114 are rotated to a louver position included within an angular range of plus or minus (+/−) 20 degrees from the fully opened position A (FIG. 3), or +/−15 degrees from the fully opened position A, or +/−10 degrees from the fully opened position A, or +/−5 degrees from the fully opened position A, or +/−2.5 degrees from the fully opened position A and/or any other subranges therebetween, including any sub-range(s) defined within such range(s) in increments of 0.5 degrees. Additionally, in one embodiment, the position of each outer detent 287D*, 287E* may be selected such that the follower member is received within one of the outer detents 287D*, 287E* when the louvers 114 are rotated to a louver position included within an angular range of plus or minus (+/−) 20 degrees from the adjacent louver transition position B1, B2 (FIG. 3) for the respective outer detent 287D*, 287E* (e.g., the first louver transition position B1 for the first outer detent 287D* and the second louver transition position B2 for the second outer detent 287E*), or +/−15 degrees from the adjacent louver transition position B1, B2, or +/−10 degrees from the adjacent louver transition position B1, B2, or +/−5 degrees from the adjacent louver transition position B1, B2, or +/−2.5 degrees from the adjacent louver transition position B1, B2 and/or any other subranges therebetween, including any sub-range(s) defined within such range(s) in increments of 0.5 degrees. Moreover, in one embodiment, the position of each intermediate detent 287B*, 287C* may be selected such that the follower member is received within one of the intermediate detents 287B*, 287C* when the louvers 114 are rotated to a louver position included within an angular range of less than about 55 degrees and greater than about 15 degrees from the fully opened position A (FIG. 3), or less than about 50 degrees and greater than about 20 degrees from the fully opened position A, or less than about 45 degrees and greater than about 25 degrees from the fully opened position A, or less than about 40 degrees and greater than about 30 degrees from the fully opened position A, or less than about 37.5 degrees and greater than about 32.5 degrees from the fully opened position A and/or any other subranges therebetween, including any sub-range(s) defined within such range(s) in increments of 0.5 degrees.

Additionally, it should be appreciated that the relative spacing defined between adjacent detents 287* along the first cam profile position 270* of the actuator 204* may be constant or may be varied. For instance, in one embodiment, the relative spacing defined between adjacent detents 287* may be selected such that opposed follower member is moved along the first cam profile position 270* from one of the detents 287* to an adjacent detent 287* as the louvers 114 are rotated across an angular range of less than about 55 degrees and greater than about 15 degrees, or less than about 50 degrees and greater than about 20 degrees, or less than about 45 degrees and greater than about 25 degrees, or less than about 40 degrees and greater than about 30 degrees, or less than about 37.5 degrees and greater than about 32.5 degrees and/or any other subranges therebetween, including any sub-range(s) defined within such range(s) in increments of 0.5 degrees It should be appreciated that, although the detented cam profile portion 270* of the engagement section 262* is generally described herein with reference to a single actuator, such cam profile portion 270* may be provided on the engagement sections of both of the actuators of a louver closure assembly. For instance, as indicated above, when the actuator 204* corresponds to the second actuator 204 of the louver closure assembly 200, the first actuator 202 of the louver closure assembly 200 may have similarly configured engagement section including a detented cam profile portion 270* for engaging the corresponding follower member (e.g., the spring-biased plunger 248*) of the actuator 204*. It should also be appreciated that the detented cam profile portion 270* may also form part of the engagement section 458 of the louver closure assembly 400 described above with reference to FIGS. 14-16.

While the foregoing Detailed Description and drawings represent various embodiments, it will be understood that various additions, modifications, and substitutions may be made therein without departing from the spirit and scope of the present subject matter. Each example is provided by way of explanation without intent to limit the broad concepts of the present subject matter. In particular, it will be clear to those skilled in the art that principles of the present disclosure may be embodied in other forms, structures, arrangements, proportions, and with other elements, materials, and components, without departing from the spirit or essential characteristics thereof. For instance, features illustrated or described as part of one embodiment can be used with another embodiment to yield a still further embodiment. Thus, it is intended that the present subject matter covers such modifications and variations as come within the scope of the appended claims and their equivalents. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present subject matter. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the present subject matter being indicated by the appended claims, and not limited to the foregoing description.

In the foregoing Detailed Description, it will be appreciated that the phrases "at least one", "one or more", and "and/or", as used herein, are open-ended expressions that are both conjunctive and disjunctive in operation. The term "a" or "an" element, as used herein, refers to one or more of that element. As such, the terms "a" (or "an"), "one or more" and "at least one" can be used interchangeably herein. All directional references (e.g., proximal, distal, upper, lower, upward, downward, left, right, lateral, longitudinal, front, rear, top, bottom, above, below, vertical, horizontal, crosswise, radial, axial, clockwise, counterclockwise, and/or the like) are only used for identification purposes to aid the reader's understanding of the present subject matter, and/or serve to distinguish regions of the associated elements from one another, and do not limit the associated element, particularly as to the position, orientation, or use of the present subject matter. Connection references (e.g., attached, coupled, connected, joined, secured, mounted and/or the like) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

All apparatuses and methods disclosed herein are examples of apparatuses and/or methods implemented in accordance with one or more principles of the present subject matter. These examples are not the only way to implement these principles but are merely examples. Thus, references to elements or structures or features in the drawings must be appreciated as references to examples of embodiments of the present subject matter, and should not be understood as limiting the disclosure to the specific elements, structures, or features illustrated. Other examples of manners of implementing the disclosed principles will occur to a person of ordinary skill in the art upon reading this disclosure.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

What is claimed is:

1. A shutter panel for an architectural opening, said shutter panel comprising:

a frame;

a louver rotatably coupled to said frame, said louver rotatable about a longitudinal axis across an angular travel range comprising a first angular range of louver positions and a second angular range of louver positions, the first angular range of louver positions differing from the second angular range of louver positions; and a louver closure assembly operable to automatically rotate said louver into a closed position when said louver is moved into the second angular range of louver positions, said louver closure assembly comprising first and second actuators positioned within said frame, said first and second actuators being coupled to said louver such that linear translation of said first and second actuators results in rotation of said louver, said first actuator including a first rack section and a follower member, said second actuator including a second rack section and an engagement section;

wherein:

when said louver is rotated to a louver position within the second angular range of louver positions, said follower member of said first actuator engages said engagement section of said second actuator in a manner such that the engagement of said first and second actuators generates a resultant force applied through said first and second actuators that results in opposed linear translation of said first and second actuators to automatically rotate said louver from said louver position into the closed position;

a tilt gear is positioned between the first and second rack sections and is configured to engage the first and second rack sections such that the opposed linear translation of said first and second actuators results in rotation of said tilt gear; and said follower member and said first rack section linearly translate together in a first direction with the opposed linear translation of said first and second actuators and said engagement section and said second rack section linearly translate together in an opposed second direction with the opposed linear translation of said first and second actuators.

2. The shutter panel of claim 1, further comprising a damper operable to resist rotation of said louver into the closed position when said louver is moved into the second angular range of louver positions.

3. The shutter panel of claim 2, wherein said damper is operable to resist rotation of said louver by selectively engaging said louver closure assembly when said louver is moved into the second angular range of louver positions in a manner that resists linear translation of said first and second actuators.

4. The shutter panel of claim 3, wherein:

said damper is disengaged from said louver closure assembly as said louver is rotated through the first angular range of louver positions such that said louver is rotatable without said damper resisting the rotation thereof; and said damper engages said louver closure assembly as said louver is rotated through the second angular range of louver positions such that said damper acts to resist rotation of said louver.

5. The shutter panel of claim 3, wherein:

the closed position comprises a first closed position and the angular travel range further comprises a third angular range of louver positions that differs from the first and second angular ranges of louver positions;

said louver closure assembly is further operable to automatically rotate said louver into a second closed position when said louver is moved into the third angular range of louver positions; and said damper is operable to resist rotation of said louver into the second closed position when said louver is moved into the third angular range of louver positions.

6. The shutter panel of claim 5, wherein:

said damper engages only one of said first actuator or said second actuator as said louver is rotated through the second angular range of louver positions such that said damper acts to resist rotation of said louver into the first closed position; and said damper engages only the other of said first actuator or said second actuator as said louver is rotated through the third angular range of louver positions such that said damper acts to resist rotation of said louver into the second closed position.

7. The shutter panel of claim 1, wherein:

the closed position comprises a first closed position and the angular travel range further comprises a third angular range of louver positions that differs from the first and second angular ranges of louver positions; and said louver closure assembly is further operable to automatically rotate said louver into a second closed position when said louver is moved into the third angular range of louver positions.

8. The shutter panel of claim 1, wherein:

said engagement section of said second actuator defines a cam profile; and said follower member of said first actuator is biased into engagement with said engagement section of said second actuator such that said follower member rides along said cam profile as said first and second actuators linearly translate with rotation of said louver.

9. The shutter panel of claim 8, wherein:

said cam profile comprises a first cam profile portion and a second cam profile portion;

said follower member rides along said first cam profile portion with linear translation of said first and second actuators as said louver is rotated across the first angular range of louver positions; and said follower member rides along said second cam profile portion with linear translation of said first and second actuators as said louver is rotated across the second angular range of louver positions.

10. The shutter panel of claim 9, wherein said second cam profile portion is shaped and configured such that, as said louver is rotated from the first angular range of louver positions to the second angular range of louver positions, said follower member engages said engagement section of said second actuator in a manner such that the resultant force is generated and is applied through said first and second actuator to force said first and second actuators to translate linearly in opposite directions within said frame.

11. The shutter panel of claim 10, wherein:

said second cam profile portion comprises a ramp surface; and said follower member is biased into engagement with said engagement section of said second actuator such that, as said follower member rides along said ramp surface, the resultant force is applied through said first and second actuators that results in the opposed linear translation of said first and second actuators within said frame.

12. The shutter panel of claim 9, wherein:

said second actuator includes a plurality of spaced apart detents defined across said first cam profile; and each of said detents corresponding to a respective louver position defined within the first angular range of louver positions.

13. The shutter panel of claim 1, wherein:

said louver comprises one of a plurality of louvers rotatably coupled to said frame;

said tilt gear is one of a plurality of tilt gears of the shutter panel;

said shutter panel further comprises first and second gear racks extending within said frame;

each of said plurality of tilt gears is configured to mesh with said first and second gear racks;

each of said plurality tilt gears is coupled to a respective one of said plurality of louvers for rotation therewith; and said first and second actuators are coupled to said first and second gear racks, respectively, such that said first and second actuators translate linearly with linear movement of said first and second gear racks within said frame as said plurality of louvers are being rotated.

14. The shutter panel of claim 13, wherein:

said first gear rack is formed from a plurality of first rack segments and said second gear rack is formed from a plurality of second rack segments; and said louver closure assembly is configured to be installed between an adjacent pair of first rack segments of said plurality of first rack segments of said first gear rack and an adjacent pair of second rack segments of said plurality of second rack segments of said second gear rack.

15. A shutter panel for an architectural opening, said shutter panel comprising:

a frame;

a louver rotatably coupled to said frame, said louver rotatable about a longitudinal axis across an angular travel range between a first closed position and a second closed position;

a louver closure assembly operable to rotate said louver into both the first closed position when said louver is moved into a first range of louver positions of the angular travel range and the second closed position when said louver is moved into a second range of louver positions of the angular travel range, said louver closure assembly comprising first and second actuators positioned within said frame; and a damper operable to resist rotation of said louver into the first and second closed positions, said damper defining a common contact end configured to engage said first and second actuators depending on a current position of said louver;

wherein said common contact end of said damper engages only one of said first actuator or said second actuator when said louver is moved into the first range of louver positions to resist rotation of said louver and wherein said common contact end of said damper engages only the other of said first actuator or said second actuator when said louver is moved into the second range of louver positions to resist rotation of said louver.

16. The shutter panel of claim 15, wherein:

the angular travel range further comprises a third range of louver positions defined between the first and second ranges of louver positions; and said common contact end of said damper is disengaged from both said first actuator and said second actuator as said louver is rotated through the third range of louver positions.

17. The shutter panel of claim 16, wherein the third range of louver positions encompasses a fully opened position of said louver defined between said first and second closed positions.

18. The shutter panel of claim 17, wherein said damper is positioned within said frame relative to said louver closure assembly such that a contact surface of the one of said first actuator or said second actuator contacts said common contact end of said damper as said louver is rotated through the first range of louver position and a contact surface of the other of said first actuator or said second actuator contacts said common contact end of said damper as said louver is rotated through the second range of louver positions.

19. A shutter panel for an architectural opening, said shutter panel comprising:

a frame;

a louver rotatably coupled to said frame, said louver rotatable about a longitudinal axis across an angular travel range between a first closed position and a second closed position;

first and second actuators configured to linearly translate within said frame with rotation of said louver across the angular travel range; and a damper operable to resist rotation of said louver into the first and second closed positions, said damper defining a common contact end configured to engage said first and second actuators depending on a current position of said louver;

wherein said common contact end of said damper engages only one of said first actuator or said second actuator when said louver is rotated in a first direction towards the first closed position and wherein said common contact end of said damper engages only the other of said first actuator or said second actuator when said louver is rotated in a second direction opposite the first direction towards the second closed position.

20. The shutter panel of claim 1, wherein:

said follower member is spaced apart from said first rack section along said first actuator; and said engagement section is spaced apart from said second rack section along said second actuator.

21. The shutter panel of claim 15, wherein said damper comprises a linear damper configured to resist rotation of said louver by reducing a rate of linear translation of said first and second actuators due to the engagement of said common contact end with one said first actuator or said second actuator depending on the current position of said louver.

22. The shutter panel of claim 19, wherein said damper comprises a linear damper configured to resist rotation of said louver by reducing a rate of linear translation of said first and second actuators due to the engagement of said common contact end with one said first actuator or said second actuator depending on the current position of said louver.

23. The shutter panel of claim 19, wherein said common contact end of said damper is disengaged from both said first actuator and said second actuator as said louver is rotated through a range of louver positions defined between the first and second closed positions.

* * * * *